US009883320B2

(12) United States Patent
Kim et al.

(10) Patent No.: US 9,883,320 B2

(45) Date of Patent: Jan. 30, 2018

(54) METHOD FOR PROCESSING REQUEST MESSAGE IN WIRELESS COMMUNICATION SYSTEM AND APPARATUS THEREFOR

(71) Applicant: LG ELECTRONICS INC., Seoul (KR)

(72) Inventors: Seongyun Kim, Seoul (KR); Seungkyu Park, Seoul (KR); Hongbeom Ahn, Seoul (KR); Seungmyeong Jeong, Seoul (KR); Heedong Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/327,757

(22) PCT Filed: Jul. 21, 2015

(86) PCT No.: PCT/KR2015/007546

§ 371 (c)(1),
(2) Date: Jan. 20, 2017

(87) PCT Pub. No.: WO2016/013846

PCT Pub. Date: Jan. 28, 2016

(65) Prior Publication Data

US 2017/0215026 A1 Jul. 27, 2017

Related U.S. Application Data

(60) Provisional application No. 62/026,704, filed on Jul. 21, 2014, provisional application No. 62/188,745, filed on Jul. 6, 2015.

(51) Int. Cl.

| | |
|---|---|
| ***H04W 4/00*** | (2009.01) |
| ***H04W 60/00*** | (2009.01) |
| ***H04W 12/10*** | (2009.01) |
| ***H04W 72/04*** | (2009.01) |

(52) U.S. Cl.

CPC ........... *H04W 4/005* (2013.01); *H04W 12/10* (2013.01); *H04W 60/005* (2013.01); *H04W 72/0406* (2013.01)

(58) Field of Classification Search

CPC ... H04W 4/005; H04W 60/005; H04W 12/10; H04W 72/0406

See application file for complete search history.

(56) References Cited

U.S. PATENT DOCUMENTS

| | | | | |
|---|---|---|---|---|
| 8,737,989 B2 * | 5/2014 | Luft | H04W 4/00 370/338 |
| 8,949,997 B2 * | 2/2015 | Schmidt | H04L 9/3234 726/26 |

(Continued)

FOREIGN PATENT DOCUMENTS

| | | |
|---|---|---|
| KR | 10-2010-0138684 A | 12/2010 |
| KR | 10-2012-0140249 A | 12/2012 |
| KR | 10-1274966 B1 | 7/2013 |

OTHER PUBLICATIONS

ETSI, "Machine-to-Machine communications (M2M); M2M service requirements," ETSI TS 102 689 V2.1.1, Jul. 1, 2013, pp. 1-35.

*Primary Examiner* — Sonny Trinh

(74) *Attorney, Agent, or Firm* — Birch, Stewart, Kolasch & Birch, LLP

(57) ABSTRACT

Suggested is a method for processing a request message in a wireless communication system according to one example of the present invention. The method comprises the steps of: receiving, by a first M2M entity, a request message relating to an operation for a specific resource from a second M2M entity; determining whether or not the first M2M entity has the specific resource; and if the first M2M entity does not have the specific resource, determining whether or not an integrity code is included in the request message, and if the integrity code is included in the request message, delivering the request message to a third M2M entity, or the method may comprise the steps of: if the first M2M entity has the (Continued)

specific resource, determining whether or not the first M2M entity has a registration relation with the second M2M entity; and if the first M2M entity has no registration relation with the second M2M entity, performing verification on the integrity code included in the request message.

18 Claims, 11 Drawing Sheets

(56) References Cited

U.S. PATENT DOCUMENTS

| | | | | |
|---|---|---|---|---|
| 9,288,059 | B2 * | 3/2016 | Nix | H04W 52/0235 |
| 9,326,173 | B2 * | 4/2016 | Luft | H04W 4/00 |
| 9,641,327 | B2 * | 5/2017 | Nix | H04W 52/0235 |
| 2013/0198838 | A1 * | 8/2013 | Schmidt | H04L 9/3234 726/22 |
| 2013/0291100 | A1 * | 10/2013 | Ganapathy | H04L 63/1466 726/22 |
| 2014/0056220 | A1 | 2/2014 | Poitau et al. | |
| 2015/0106616 | A1 * | 4/2015 | Nix | H04W 52/0235 713/156 |
| 2015/0215281 | A1 * | 7/2015 | Schmidt | H04L 9/3234 726/12 |
| 2016/0164678 | A1 * | 6/2016 | Nix | H04W 52/0235 380/270 |
| 2016/0306975 | A1 * | 10/2016 | Schmidt | H04L 9/3234 |
| 2016/0337354 | A1 * | 11/2016 | Smadja | H04L 63/062 |

* cited by examiner

METHOD FOR PROCESSING REQUEST MESSAGE IN WIRELESS COMMUNICATION SYSTEM AND APPARATUS THEREFOR

CROSS REFERENCE TO RELATED APPLICATIONS

This application is the National Phase of PCT International Application No. PCT/KR2015/007546, filed on Jul. 21, 2015, which claims priority under 35 U.S.C. 119(e) to U.S. Provisional Application No. 62/026,704, filed on Jul. 21, 2014 and 62/188,745, filed on Jul. 6, 2015, all of which are hereby expressly incorporated by reference into the present application.

TECHNICAL FIELD

The present invention relates to a method and apparatus for processing a request message in a wireless communication system.

BACKGROUND ART

As the ubiquitous era took off, machine to machine (M2M) communication has attracted much attention. The M2M communication technology is under study in many standardization development organizations (SDOs) such as TIA, ATIS, ETSI, and oneM2M. In an M2M environment, communication may be conducted between a plurality of M2M applications (network applications/gateway applications/device applications), and different entities may manage an M2M platform or framework (e.g., a common service entity (CSE)) and an application on a network side (e.g., a network application).

Accordingly, it is essential to transmit a request message from one entity to another entity. However, an entity transmitting a request message may manipulate the request message and transmit the manipulated request message to another entity, for a purpose other than an original purpose, for example, an impersonation attack.

In this context, the present invention is intended to provide a method for preventing a security-related attack such as an impersonation attack in relation to message transmission in an M2M system.

DISCLOSURE

Technical Problem

An object of the present invention devised to solve the problem is to provide a method for transmitting a message and processing the message, particularly a method for processing a request message to prevent a malicious attack.

The objects to be achieved by the present invention are not limited to the above-described objects and those skilled in the art may consider other objects from the following description of the embodiments of the present invention.

Technical Solution

In an aspect of the present invention, provided herein is a method for processing a request message by a first machine to machine (M2M) entity in a wireless communication system. The method may include receiving a request message related to an operation for a specific resource from a second M2M entity, determining whether the first M2M entity has the specific resource, and if the first M2M entity does not have the specific resource, determining whether an integrity code is included in the request message, if the integrity code is included in the request message, transmitting the request message to a third M2M entity or if the first M2M entity has the specific resource, determining whether the first M2M entity is in a registration relationship with the second M2M entity, and if the first M2M entity is not in the registration relationship with the second M2M entity, verifying an integrity code included in the request message.

Additionally or alternatively, the determining of whether the first M2M entity is in a registration relationship with the second M2M entity may include determining whether an originator identifier (ID) included in the request message is identical to an ID of the second M2M entity.

Additionally or alternatively, the determining of whether the first M2M entity is in a registration relationship with the second M2M entity may include determining whether information related to the second M2M entity is stored in a specific attribute of resources that the first M2M entity has.

Additionally or alternatively, if an originator of the request message is not in the registration relationship with an entity having the specific resource, the originator may include the integrity code in the request message.

Additionally or alternatively, information used for generation of the integrity code may be shared preliminarily between an originator of the request message and an entity having the specific resource.

Additionally or alternatively, information to be protected with the integrity code may include a specific part of the request message.

Additionally or alternatively, the specific part may include originator information of the request message.

Additionally or alternatively, the method may further include determining whether an ID of the second M2M entity is related to an ID associated with a credential related to security association.

Additionally or alternatively, the determining of whether the first M2M entity has the specific resources may be performed, only if it is determined that an ID of the second M2M entity is related to an ID associated with a credential related to security association.

In another aspect of the present invention, an M2M apparatus for processing a request message in a wireless communication system may include a radio frequency (RF) unit, and a processor configured to control the RF unit. The processor may be configured to receive a request message related to an operation for a specific resource from a second M2M entity, to determine whether the first M2M entity has the specific resource, to determine, if the first M2M entity does not have the specific resource, whether an integrity code is included in the request message, to transmit, if the integrity code is included in the request message, the request message to a third M2M entity or to determine, if the first M2M entity has the specific resource, whether the first M2M entity is in a registration relationship with the second M2M entity, and to verify, if the first M2M entity is not in the registration relationship with the second M2M entity, an integrity code included in the request message.

Additionally or alternatively, to determine whether the first M2M entity is in the registration relationship with the second M2M entity, the processor may be configured to determine whether an originator ID included in the request message is identical to an ID of the second M2M entity.

Additionally or alternatively, to determine whether the first M2M entity is in the registration relationship with the second M2M entity, the processor may be configured to determine whether information related to the second M2M entity is stored in a specific attribute of resources that the first M2M entity has.

Additionally or alternatively, if an originator of the request message is not in the registration relationship with an entity having the specific resource, the originator may include the integrity code in the request message.

Additionally or alternatively, information used for generation of the integrity code may be shared preliminarily between an originator of the request message and an entity having the specific resource.

Additionally or alternatively, information to be protected with the integrity code may include a specific part of the request message.

Additionally or alternatively, the specific part may include originator information of the request message.

Additionally or alternatively, the processor may be configured to determine whether an ID of the second M2M entity is related to an ID associated with a credential related to security association.

Additionally or alternatively, it may be determined whether the first M2M entity has the specific resources is performed, only if it is determined that an ID of the second M2M entity is related to an ID associated with a credential related to security association.

The above technical solutions are mere parts of the embodiments of the present invention, and those skilled in the art will derive and understand various embodiments reflecting technical features of the present invention based on the following detailed description of the present invention.

Advantageous Effects

According to an embodiment of the present invention, a malicious attack can be prevented in relation to message transmission.

The effects of the present invention are not limited to the above-described effects and other effects which are not described herein will be understood by those skilled in the art from the following description of the embodiments of the present invention.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Reference will now be made in detail to the preferred embodiments of the present invention, examples of which are illustrated in the accompanying drawings. The following detailed description of the invention includes details to aid in full understanding of the present invention. Those skilled in the art will appreciate that the present invention can be implemented without these details.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

In the present disclosure, devices for device-to-device communication, that is, M2M devices, may be fixed or mobile and include devices which communicate with a server for device-to-device communication, that is, an M2M server to transmit/receive user data and/or various types of control information. The M2M devices may be referred to as terminal equipment, mobile stations (MSs), mobile terminals (MTs), user terminals (UTs), subscriber stations (SSs), wireless devices, personal digital assistants (PDA), wireless modems, handheld devices and the like. In the present invention, the M2M server refers to a fixed station which communicates with M2M devices and/or other M2M servers, and exchanges various types of data and control information with M2M devices and/or other M2M servers by communicating with the M2M devices and/or other M2M servers.

A description will be given of technology associated with the present invention.

M2M Applications

These are applications that execute service logic and use a common service entity (CSE) accessible through an open interface. The M2M applications can be installed in an M2M device, an M2M gateway or an M2M server.

M2M Service

This is a set of functions that can be used by the M2M CSE through standardized interfaces.

oneM2M defines a common M2M service framework (or service platform, CSE or the like) for various M2M applications (or application entities (AEs)). M2M applications can be considered as software implementing service logic such as e-Health, City Automation, Connected Consumer and Automotive. The oneM2M service framework includes functions commonly necessary to implement various M2M applications. Accordingly, it is possible to easily implement various M2M applications using the oneM2M service framework without configuring frameworks necessary for the respective M2M applications. This can integrate M2M markets currently divided into many M2M verticals, such as smart building, smart grid, e-Heath, transportation and security, and thus remarkable growth of the M2M markets is expected.

Figure 1:
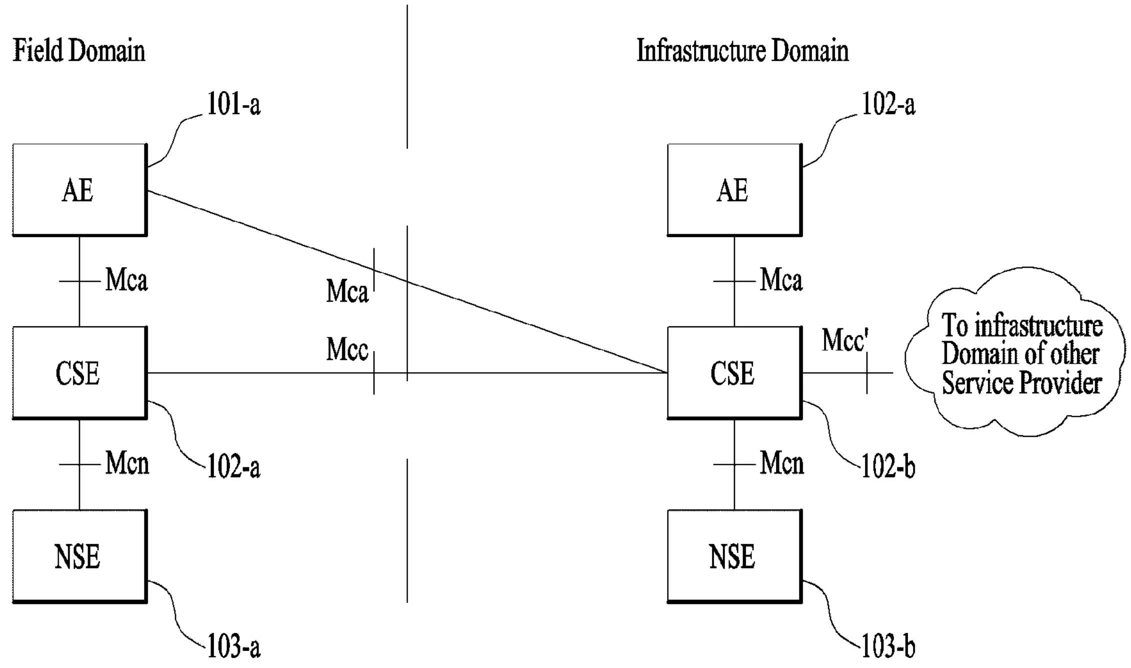
FIG. 1 illustrates a functional structure of a machine to machine (M2M) communication system.

FIG. 1 illustrates the architecture of an M2M communication system. Each entity will now be described.

Application entity (AE, 101): Application entity provides application logic for end-to-end M2M solutions. Examples of the application entity include fleet tracking application, remote blood sugar monitoring application, remote power metering and controlling application.

Common service entity (CSE, 102): CSE comprises the set of "service functions" that are common to M2M environments and specified by oneM2M. Such service functions are exposed to AEs and other CSEs through reference points X and Y and used by the AEs and other CSEs. The reference point Z is used for accessing underlying network service entities.

Examples of the service functions provided by the CSE include data management, device management, M2M subscription management and location service. These functions can be logically classified into common service functions (CSFs). Some CSFs in the CSE are mandatory and some may be optional. Further, some functions in the CSFs are mandatory and some functions may be optional (e.g. some of application software installation, firmware update, logging and monitoring functions in "device management" CSF are mandatory functions and some are optional functions.)

Underlying network service entity (NSE, 103): provides services to the CSEs. Examples of such services include device management, location services and device triggering. No particular organization of the NSEs is assumed. Note: underlying networks provide data transport services between entities in the oneM2M system. Such data transport services are not included in the NSE.

The reference points shown in FIG. 1 will now be described.

Mca Reference Point

This is the reference point between an AE and a CSE. The Mca reference point allows the CSE to communicate with the AE such that the AE can use the services provided by the CSE.

The services provided through the Mca reference point are dependent on the functionality supported by the CSE. The AE and the CSE may or may not be co-located within the same physical entity.

Mcc Reference Point

This is the reference point between two CSEs. The Mcc reference point allows a CSE to use the services of another CSE in order to fulfill needed functionality. Accordingly, the Mcc reference point between two CSEs is supported over different M2M physical entities. The services offered via the Mcc reference point are dependent on the functionality supported by the CSEs.

Mcn Reference Point

This is the reference point between a CSE and an NSE. The Mcn reference point allows a CSE to use the services (other than transport and connectivity services) provided by the NSE in order to fulfill the needed functionality. It means services other than simple service such as transport and connectivity, for example, services such as device triggering, small data transmission and positioning.

Mcc' Reference Point

This is the reference point is used for communication between CSEs respectively belongs to different M2M service providers. Mcc' references point is similar to Mcc reference point in respect of connecting CSEs each other, but Mcc' reference point expands Mcc reference point to different M2M service providers while Mcc reference point is limited to communication in a single M2M service provider.

Figure 2:
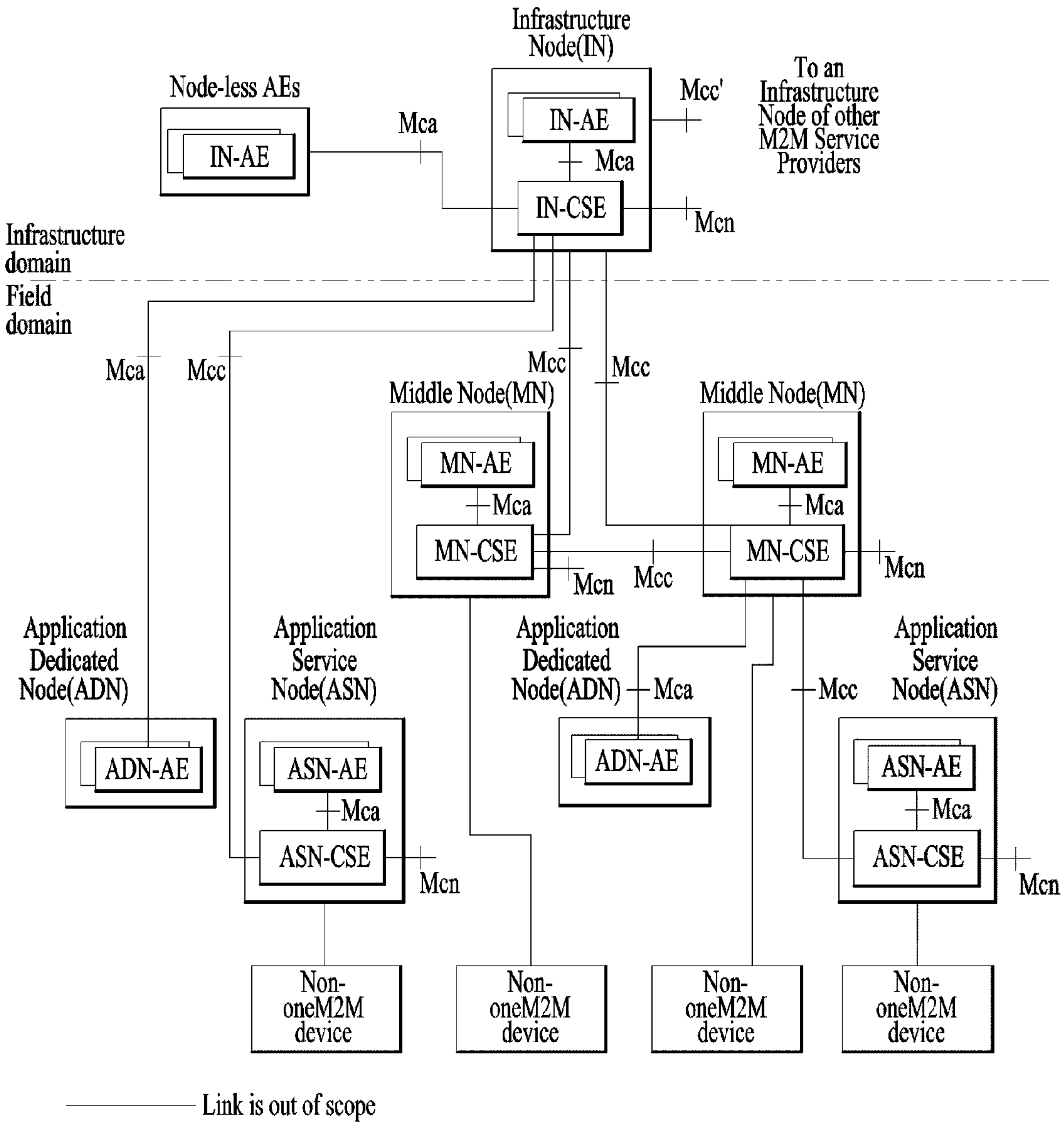
FIG. 2 is a block diagram of a configuration supported based on the M2M functional structure by the M2M communication system.

FIG. 2 illustrates compositions supported by M2M communication system based on the architecture. The M2M communication system may support more various compositions without being limited to the illustrated compositions. A concept, which is called to node, important for understand the illustrated compositions will be explained.

Application Dedicated Node (ADN): An application dedicated node is a node that contains at least oneM2M application and does not contain a CSE. The ADN can communicate over an Mca reference point with one middle node or one infrastructure node. The ADN can be present in an M2M device.

Application Service Node (ASN): An application service node is a node that contains at least one CSE and has at least oneM2M application. The ASN can communicate over a Mcc reference point with one middle node or one infrastructure node. The ASN can be present in an M2M device.

Middle Node (MN): A middle node is a node that contains at least one CSE and may contain M2M applications. The middle node communicates over a Mcc references point with at least two nodes belonging to the following different category:

one or more ASNs;

one or more middle nodes (MNs); and one infrastructure structure.

The MN can be connected with the ADN through an Mca reference point. The MN can be present in an M2M gateway.

Infrastructure Node (IN): An infrastructure node is a node that contains one CSE and may contain application entities (AEs). The IN can be present in M2M server.

The IN communicates over a Mcc reference point with either:

one or more middle nodes; and/or one or more application service nodes.

The IN may communicate with one or more ADNs over one or more Mca reference points.

Figure 3:
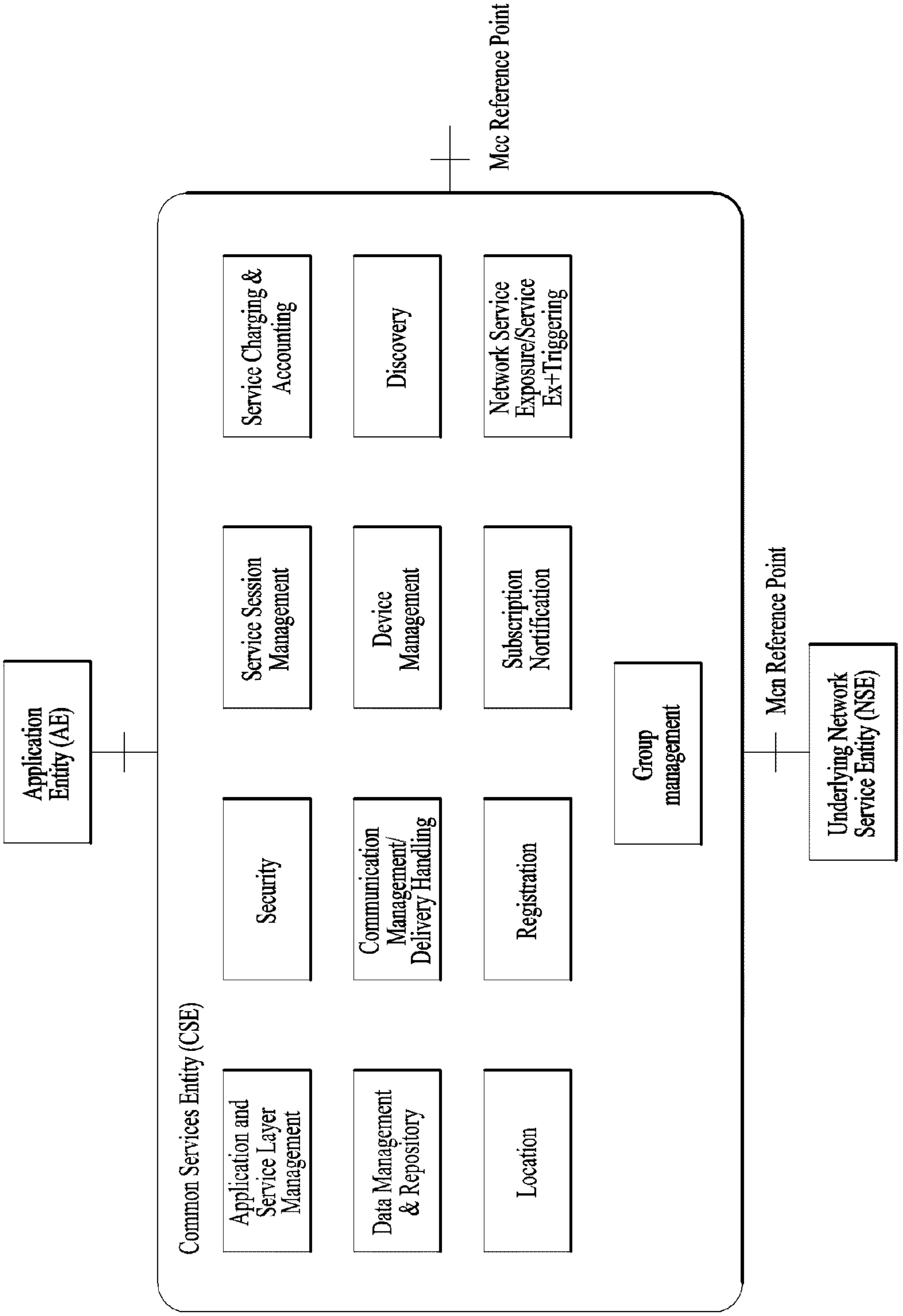
FIG. 3 illustrates a common services function (CSF) provided by the M2M communication system.

FIG. 3 illustrates M2M service functions in the M2M communication system.

M2M service functions (i.e. common service functions) provided by the oneM2M service framework include "Communication Management and Delivery Handling", "Data Management and Repository", "Device Management", "Discovery", "Group Management", "Addressing and Identification", "Location", "Network Service Exposure, Service Execution and Triggering", "Registration", "Security", "Service Charging and Accounting", "Session Management" and "Subscription and Notification.", as shown in FIG. 3.

A brief description will be given of each M2M service function.

Communication Management and Delivery Handling (CMDH): this provides communications with other CSEs, AEs and NSEs and delivers messages.

Data Management and Repository (DMR): this enables M2M applications to exchange and share data.

Device Management (DMG): this manages M2M devices/gateways. Specifically, the device management function includes installation and setting of applications, determination of set values, firmware update, logging, monitoring, diagnostics, topology management, etc.

Discovery (DIS): this discovers resources and information based on conditions.

Group Management (GMG): this processes a request related to a group that may be generated by grouping resources, M2M devices or gateways.

Addressing and Identification (AID): this identifies and addresses physical or logical resources.

Location (LOC): this enables M2M applications to obtain position information of an M2M device or gateway.

Network Service Exposure, Service Execution and Triggering (NSE): this enables communication of an underlying network and use of functions provided by the underlying network.

Registration (REG): this handles registration of an M2M application or another CSE with a specific CSE. Registration is performed in order to use M2M service functions of the specific CSE.

Security (SEC): this performs handling of sensitive data such as a security key, association establishment, authentication, authorization, identity protection, etc.

Service Charging and Accounting (SCA): this provides a charging function to CSEs.

Session Management (SM): this manages an M2M session for end-to-end communication.

Subscription and Notification (SUB): this notifies change of a specific resource when the change of the specific resource is subscribed.

The M2M service functions are provided through CSE, and AE (or, M2M applications) may use through Mca reference point, or other CSE may use the M2M service functions through Mcc reference point. Also, the M2M service functions may be operated synchronized with underlying network (or underlying network service entity (NSE) such as 3GPP, 3GPP2, Wi-Fi, Bluetooth).

All oneM2M devices/gateways/infrastructures do not have higher functions and may have mandatory functions and some optional functions from among the corresponding functions.

The term “resource” in the M2M communication system may be used to construct and express information in the M2M communication system, and may indicate all kinds of things capable of being identified by URI. The resource may be classified into a general resource, a virtual resource, and an announced resource. Respective resources can be defined as follows.

Virtual Resource: The virtual resource may trigger specific processing, and/or may perform retrieving of the result. The virtual resource is not permanently contained in CSE.

Announced Resource: The announced resource is a resource contained in the resource CSE connected to the announced (or notified) original resource. The announced resource may maintain some parts of the characteristics of the original resource. The resource announcement may facilitate the resource searching or discovery. The announced resource contained in the remote CSE is not present as a child of the original resource in the remote CSE, or may be used to generate child resources instead of the announced child of the original resource.

General resource: If this resource is not designated as the virtual or announced resource, the corresponding resource is a general resource.

Figure 4:
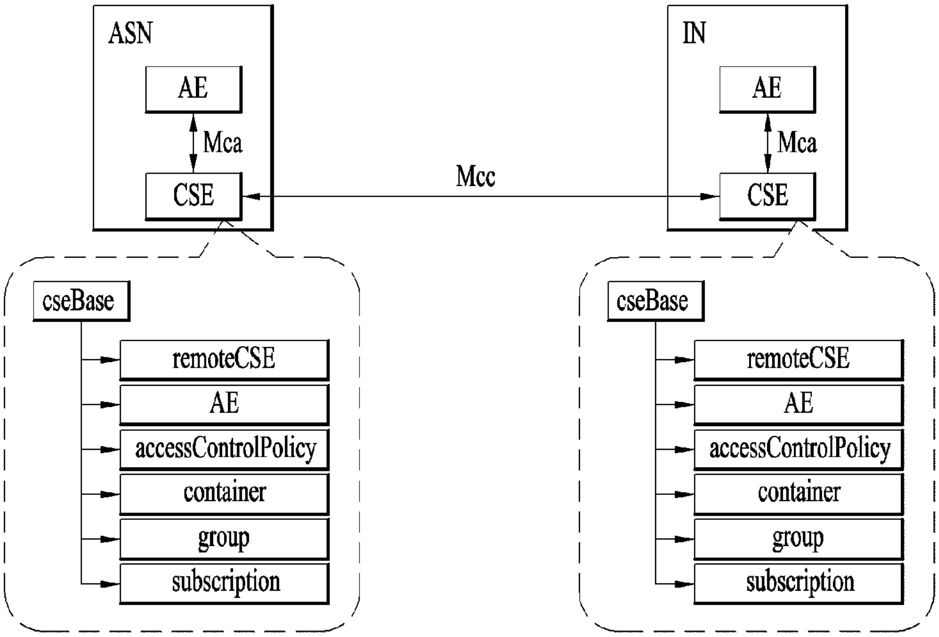
FIG. 4 illustrates resource structures in an M2M application service node and an M2M infrastructure node.

FIG. 4 illustrates structures of resources present in an M2M application service node and an M2M infrastructure node.

The M2M architecture defines various resources. M2M services for registering applications and reading sensor values can be performed by operating the resources. The resources are configured in one tree structure and may be logically connected to the CSE or stored in the CSE to be stored in M2M devices, M2M gateways, network domains and the like. Accordingly, the CSE can be referred to as an entity that manages resources. The resources have a <cseBase> as a tree root. Representative resources are described below.

<cseBase> resource: this is a root resource of oneM2M resources configured in a tree and includes all other resources.

<remoteCSE> resource: this belongs to <cseBase> resource and includes information on other CSE being connected or registered to corresponding CSE.

<AE> resource: this is a resource that is lower than <cseBase> or <remoteCSE> resource, and stores information on applications registered (connected) with the corresponding CSE when present under <cseBase> resource, and stores information on applications registered with other CSEs (in the name of CSE) when present under <remoteCSE> resource.

<accessControlPolicy> resource: this stores information associated with access rights to specific resources. Authentication is performed using access rights information included in this resource.

<container> resource: this is a resource that is lower than containers and stores data per CSE or AE.

<group> resource: this is a resource that is lower than groups and provides a function of grouping a plurality of resources and simultaneously processing the grouped resources.

<subscription> resource: this is a resource that is lower than subscriptions and executes a function of announcing a state change such as a resource value change through notification.

Figure 5:
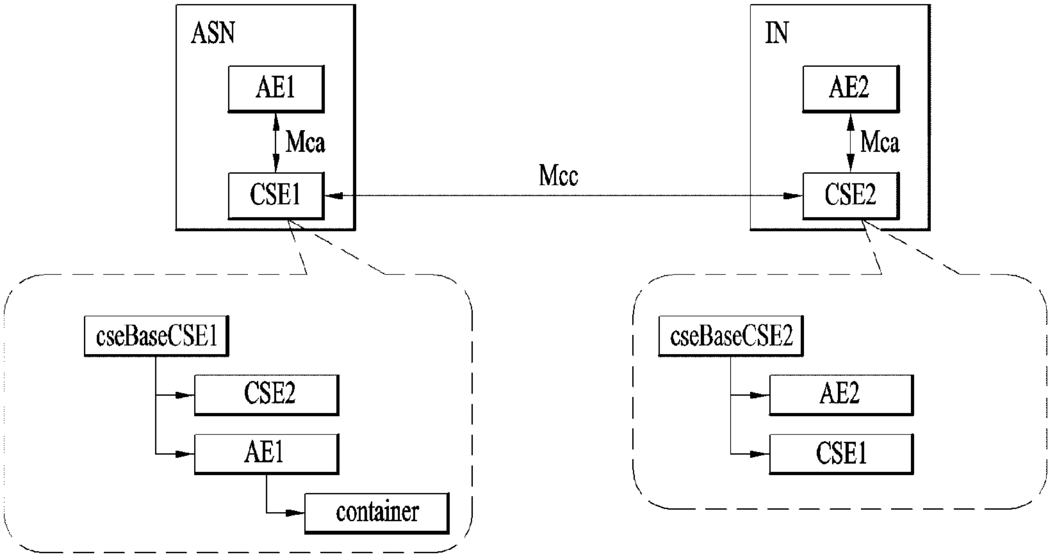
FIG. 5 illustrates resource structures in an M2M application service node (e.g., an M2M device) and an M2M infrastructure node.

FIG. 5 illustrates structures of resources present in an M2M application service node (e.g. M2M device) and an M2M infrastructure node.

A description will be given of a method by which an AE (application 2) registered with the M2M infrastructure node reads a value of a sensor of the M2M device. The sensor refers to a physical device, in general. An AE (application 1) present in the M2M device reads a value from the sensor and stores the read value in the form of a container resource in a CSE (CSE 1) in which the AE (application 1) has registered. To this end, the AE present in the M2M device needs to be pre-registered with the CSE present in the M2M device. Upon completion of registration, registered M2M application related information is stored in the form of cseBaseCSE1/application1 resource, as shown in FIG. 5.

When the sensor value is stored, by the AE present in the M2M device, in a container resource lower than the cseBaseCSE1/application1 resource, the AE registered with the infrastructure node can access the corresponding value. To enable access, the AE registered with the infrastructure node also needs to be registered with a CSE (CSE 2) of the infrastructure node. Registration of the AE is performed by storing information about application 2 in cseBaseCSE2/application2 resource as application 1 is registered with CSE 1. Application 1 communicates with application 2 via CSE 1 and CSE 2 instead of directly communicating with application 2. To this end, CSE 1 needs to be pre-registered with CSE 2. When CSE 1 registers with CSE 2, CSE 1 related information (e.g. Link) is stored in the form of <remoteCSE> resource lower than cseBaseCSE2 resource. That is, <remoteCSE> provides a CSE type, access address (IP address and the like), CSE ID, and reachability information about the registered CSE.

Resource discovery refers to a process of discovering resources present in a remote CSE. Resource discovery is performed through a retrieve request and the retrieve request for resource discovery includes the following.

<startURI>: this indicates a URI. The URI can be used to limit the range of resources to be discovered. If <startURI> indicates a resource root <cseBase>, resource discovery is performed on all resources of a receiver that has received the retrieve request. The receiver performs resource discovery only on a resource indicated by <startURI> and a lower resource thereof.

filterCriteria: this information describes information related to a resource to be discovered. The receiver searches the resources within a discovery range defined by <startURI> for a resource that satisfies filterCriteria and transmits the resource to a requester of the corresponding request.

As shown in FIG. 4 or 5, the resource for use in the M2M system may be represented by a tree structure, and the root resource type may be denoted by <CSEBase>. Therefore, the <CSEBase> resource type must be present only when the common service entity (CSE) is present.

Figure 6:
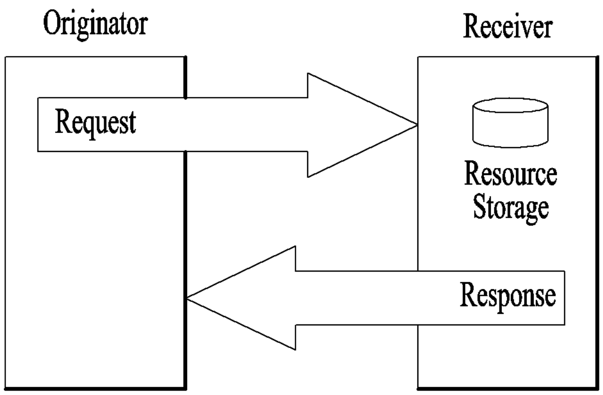
FIG. 6 is a diagram illustrating a signal flow for a procedure for exchanging a request message and a response message in the M2M communication system.

FIG. 6 is a conceptual diagram illustrating a general communication flow located at Mca and Mcc reference points. The M2M system operation is carried out on the basis of data exchanging. For example, in order to allow a first device to transmit or perform a command for stopping a specific operation of a second device, the first device must transmit the corresponding command (configured in a data form) to the second device. In the M2M system, data can be exchanged using the request and response messages during communication between the application (or CSE) and another CSE.

The request message may include the following information.

Operation: "Operation" means the shape of an operation to be carried out. (This information may be selected from among Create, Retrieve, Update, Delete, and Notify.)

To: "To" means an ID (i.e., ID of the receiver) of an entity scheduled to receive the request.

From: "From" means an ID of a calling user (i.e., call originator) who generates the request.

Request Identifier: "Request Identifier" means an ID (i.e., ID used to discriminate the request message) of the request message Content: "Content" means content of resources to be transmitted.

The response message may include the following information. If the corresponding request message is successfully processed, the response message may include the following information.

To: "To" means an ID of a calling user (i.e., a call originator) who generates the request message.

From: "From" means an ID of a called person (i.e., a call receiver) who receives the request message.

Request Identifier: "Request Identifier" means an ID of the request message used to identify the ID of the request message.

Result contents: "Result contents" means the processed result (for example, Okay, Okay and Done, Okay and in progress) of the request message.

Content: "Content" means content of resources to be transmitted (only the resultant value (rs) can be transmitted.)

If the request message processing is failed, the response message may include the following information.

To: "To" means an ID of a calling user (i.e., a call originator) who generates the request message.

From: "From" means an ID of a called person (i.e., a call receiver) who receives the request message.

Request Identifier: "Request Identifier" means an ID of the request message (so as to identify the ID of the request message).

rs: "rs" means the processed result (for example, Not Okay) of the request message.

As described above, the response message may include the above-mentioned information.

Meanwhile, various resource types shown in the following table are present.

TABLE 1

| Resource Type | Short Description | Child Resource Types | Parent Resource Types |
|---|---|---|---|
| AE | Stores information about the AE. It is created as a result of successful registration of an AE with the registrar CSE. | subscription, container, group, accessControlPolicy, mgmtObj, commCapabilities, pollingChannel | remoteCSE, CSEBase |
| cmdhNwAccessRule | Defines a rule for the usage of underlying networks. | schedule subscription | cmdhNetworkAccessRules |
| CSEBase | The structural root for all the resources that are residing on a CSE. It shall store information about the CSE itself. | remoteCSE, node, application, container, group, accessControlPolicy, subscription, mgmtObj, mgmtCmd, locationPolicy, statsConfig | None |

TABLE 1-continued

| Resource Type | Short Description | Child Resource Types | Parent Resource Types |
|---|---|---|---|
| group | Stores information about resources of the same type that need to be addressed as a Group. Operations addressed to a Group resource shall be executed in a bulk mode for all members belonging to the Group. | fanOutPoint subscription | Application, remoteCSE, CSEBase |
| locationPolicy | Includes information to obtain and manage geographical location. It is only referred from container, the contentInstances of the container provides location information. | subscription | CSEBase |
| remoteCSE | Represents a remote CSE for which there has been a registration procedure with the registrar CSE identified by the CSEBase resource. | application, container, group, accessControlPolicy, subscription, mgmtObj, pollingChannel, node | CSEBase |
| subscription | Subscription resource represents the subscription information related to a resource. Such a resource shall be a child resource for the subscribe-to resource. | schedule | accessControlPolicy, application, cmdhBuffer, cmdhDefaults, cmdhEcDefParamValues, cmdhDefEcValue, cmdhLimits, cmdhNetworkAccessRules, cmdhNwAccessRule, cmdhPolicy, container, CSEBase, delivery, eventConfig, execInstance, group, contentInstance, locationPolicy, mgmtCmd, mgmtObj, m2mServiceSubscription, node, nodeInfo, parameters, remoteCSE, request, schedule, statsCollect, statsConfig |
| container | Shares data instances among entities. Used as a mediator that takes care of buffering the data to exchange "data" between AEs and/or CSEs. | container, contentInstance, subscription | application, container, remoteCSE, CSEBase |
| contentInstance | Represents a data instance in the container resource. | subscription | container |

Each resource type may be located below the parent resource type of the corresponding resource type, and may have a child resource type. In addition, each resource type may have attributes, and actual values may be stored in the attributes.

Table 2 shows attributes of the <container> resource type. The attributes used to store the actual values may always be set to the value of 1 through multiplicity or may be selectively set to the values ('0 . . . 1') through multiplicity. In addition, the corresponding attributes may be established according to RO (Read Only), RW (Read and Write), WO (Write Only) according to characteristics generated when the corresponding attributes are generated.

TABLE 2

| Attributes of <container> | Multiplicity | RW/RO/WO | Description |
|---|---|---|---|
| resourceType | 1 | RO | Resource Type. This Write Once (at creation time then cannot be changed) resourceType attribute identifies the type of resources. Each resource shall have a resourceType attribute. |
| resourceID | 1 | RO | This attribute is an identifier for resource that is used for 'non-hierarchical URI method' or 'IDs based method' cases.<br>This attribute shall be provided by the Hosting CSE when it accepts a resource creation procedure. The Hosting CSE shall assign a resourceID which is unique in the CSE. |

TABLE 2-continued

| Attributes of <container> | Multiplicity | RW/RO/WO | Description |
|---|---|---|---|
| parent ID | 1 | RO | The system shall assign the value to this attribute according to the parameters given in the CREATE Request. It establishes the parent-child relationship by identification of the parent of this child resource. Such identifier shall use the non-hierarchical URI representation. For example, an AE resource with the identifier "myAE1" which has been created under the resource ". . .//example.com/oneM2M/myCSE", the value of the parentID attribute will contain ". . .//parentID". |
| expirationTime | 1 | RW | Time/date after which the resource will be deleted by the hosting CSE. This attribute can be provided by the Originator, and in such a case it will be regarded as a hint to the hosting CSE on the lifetime of the resource. The hosting CSE can however decide on the real expirationTime. If the hosting CSE decides to change the expirationTime attribute value, this is communicated back to the Originator. The lifetime of the resource can be extended by providing a new value for this attribute in an UPDATE operation. Or by deleting the attribute value, e.g. by not providing the attribute when doing a full UPDATE, in which case the hosting CSE can decide on a new value. This attribute shall be mandatory. If the Originator does not provide a value in the CREATE operation the system shall assign an appropriate value depending on its local policies and/or M2M service subscription agreements. |
| accessControlPolicyIDs | 0 . . . 1 (L) | RW | The attribute contains a list of identifiers (either an ID or a URI depending if it is a local resource or not) of an <accessControlPolicy> resource. The privileges defined in the <accessControlPolicy> resource that are referenced determine who is allowed to access the resource containing this attribute for a specific purpose (e.g. Retrieve, Update, Delete, etc.). |
| labels | 0 . . . 1 | WR | Tokens used as keys for discovering resources. This attribute is optional and if not present it means that the resource cannot be found by means of discovery procedure which uses labels as key parameter of the discovery. |
| creationTime | 1 | RO | Time/date of creation of the resource. This attribute is mandatory for all resources and the value is assigned by the system at the time when the resource is locally created. Such an attribute cannot be changed. |
| creator | 0 . . . 1 | RO | The AE-ID or CSE-ID of the entity which created the resource. |
| lastModifiedTime | 1 | RO | Last modification time/date of the resource. This attribute shall be mandatory and its value is assigned automatically by the system each time that the addressed target resource is modified by means of the UPDATE operation. |

TABLE 2-continued

| Attributes of <container> | Multiplicity | RW/RO/WO | Description |
|---|---|---|---|
| stateTag | 1 | RO | An incremental counter of modification on the resource. When a resource is created, this counter is set to 0, and it will be incremented on every modification of the resource. The stateTag attribute of the parent resource should be incremented first and copied into this stateTag attribute when a new instance is added to the parent resource. |
| announceTo | 0 . . . 1 | RW | This attribute may be included in a CREATE or UPDATE Request in which case it contains a list of URIs/CSE-IDs which the resource being created/updated shall be announced to.<br>This attribute shall only be present on the original resource if it has been successfully announced to other CSEs. This attribute maintains the list of URIs to the successfully announced resources. Updates on this attribute will trigger new resource announcement or de-announcement. |
| announcedAttribute | 0 . . . 1 | RW | This attributes shall only be present on the original resource if some Optional Announced (OA) type attributes have been announced to other CSEs. This attribute maintains the list of the announced Optional Attributes (OA type attributes) in the original resource. Updates to this attribute will trigger new attribute announcement if a new attribute is added or de-announcement if the existing attribute is removed.) |
| maxNrOfInstances | 0 . . . 1 | RW | Maximum number of instances of <contentInstance> child resources. |
| maxByteSize | 0 . . . 1 | RW | Maximum number of bytes that are allocated for a <container> resource for all instances in the <container> resource. |
| maxInstanceAge | 0 . . . 1 | RW | Maximum age of the instances of <contentInstance> resources within the <container>. The value is expressed in seconds. |
| currentNrOfInstances | 1 | RO | Current number of instances in a <container> resource. It is limited by the maxNrOfInstances. |
| currentByteSize | 1 | RO | Current size in bytes of data stored in a <container> resource. It is limited by the maxNrOfBytes. |
| latest | 0 . . . 1 | RO | Reference to latest <contentInstance> resource, when present. |
| locationID | 0 . . . 1 | RW | URI of the resource where the attributes/policies that define how location information are obtained and managed. This attribute is defined only when the <container> resource is used for containing location information. |
| ontologyRef | 0 . . . 1 | RW | A URI of the ontology used to represent the information that is managed and understood by the AE. The ontology refers to a specification in which terms and relationship therebetween used in a domain to be handled. |

Resource Access Control Policy

An access control policy is defined as a “white list” or privileges and each privilege defines “allowed” entities for certain access modes. Sets of privileges are handled such that the resulting privileges for a group of privileges are the sum of the individual privileges; i.e., an action is permitted if the action is permitted by some/any privilege in the set. A selfPrivilege attribute lists entities authorized for Read/Update/Delete of <accessControlPolicy> resource.

All privileges defined by the access control policy are associated with positions, time windows and IP addresses.

Privileges for accessing a resource are defined by privileges defined in <accessControlPolicy> resource by setting an accessControlPolicyID attribute on the resource.

Figure 7:
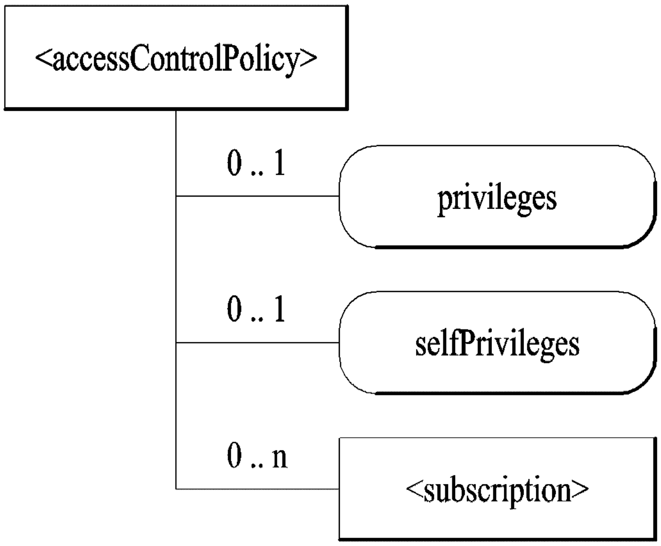
FIG. 7 illustrates the structure of an <accesControlPolicy> resource.

FIG. 7 illustrates a structure of the <accessControlPolicy> resource. The following table shows attributes of the <accessControlPolicy> resource.

TABLE 3

| Attribute Name of <accessControlPolicy> | Multiplicity | RW/RO/WO | Description |
|---|---|---|---|
| resourceType (rT) | 1 | RO | Refer to Table 2 |
| parentID (pID) | 1 | RO | Refer to Table 2 |
| expirationTime (eT) | 1 | RW | Refer to Table 2 |
| labels (lBs) | 0 . . . 1 | RW | Refer to Table 2 |
| creationTime (cT) | 1 | RO | Refer to Table 2 |
| lastModifiedTime (lMT) | 1 | RO | Refer to Table 2 |
| Link | 1 | WO | This attribute shall be present only on the announced resource. This attribute shall provide the link (URI) to the original resource. This is only for <accessControlPolicyAnnc>. |
| announceTo | 1 | RW | Refer to Table 2 |
| announcedAttribute | 1 | RW | This attributes shall only be present on the original resource if some Optional Announced (OA) type attributes have been announced to other CSEs. This attribute maintains the list of the announced Optional Attributes (OA type attributes) in the original resource. Updates to this attribute will trigger new attribute announcement if a new attribute is added or de-announcement if the existing attribute is removed. |
| privileges (ps) | 1 | RW | The list of privileges defined by this <accessControlPolicy> resource. These privileges are applied to resources referencing this <accessControlPolicy> resource using the accessControlPolicyID attribute. |
| selfPrivileges (sP) | 1 | RW | Defines the list of privileges for the <accessControlPolicy> resource itself. |

Privileges can be generalized to actions (which may be granting access, but may also be more specific, granting access, i.e. filtering part of data). While the privileges can be generalized to conditions, which may include the identifier of a requestor, except specified identifiers, but the privileges may also include time based conditions.

An access authentication mechanism based on the access control policy operates by matching a requester to the privilege of the requester, stored in the <accessControlPolicy> resource. Upon discovery of positive matching, a requested operation (e.g. RETRIEVE) is checked using a set of allowed operations associated with a matching privilege owner. If the check fails, the request is rejected. Such set is referred to as a privilege flag.

Self-privileges and privileges are lists of requester privileges associated with the <accessControlPolicy> resource itself and privilege flags applied to the <accessControlPolicy> resource and all other resource types which address accessControlPolicyID common attribute.

All privileges defined in the access control policy are associated with positions, time windows and IP addresses prior to access authentication.

Each privilege of the self-privileges and privileges can be configured as a role. Such role is identified by a role name and a URL that addresses an M2M service subscription resource in which the role is defined. When a requester represents itself with a specific role, the access control policy operates by matching the requester with lists, which belong to a specific role specified in the M2M service subscription resource.

Each privilege in the privilege and self-privilege lists includes the following elements.

TABLE 4

| Name | Description |
|---|---|
| originatorPrivileges | Refer to Table 5 |
| Contexts | Refer to Table 6 |
| operationFlags | Refer to Table 7 |

"originatorPrivileges" includes information shown in the following table.

TABLE 5

| Name | Description |
|---|---|
| Domain | FQDN domain |
| Originator identifier | CSE ID or AE ID which represent a originator identity |
| Token | Access token usually provided as query parameter |
| All | All originators |
| Role | A role name associated with the URL the a Service Subscription resource where such role is defined |

"contexts" in Table 4 includes information shown in the following table.

TABLE 6

| Name | Description |
|---|---|
| Context | Defines the context in which every privileges of the present access control policy resource applies, e.g. time windows, location, and IP address. |

“operationFlags” in Table 4 includes information shown in the following table.

TABLE 7

| Name | Description |
|---|---|
| RETRIEVE | Privilege to retrieve the content of an addressed resource |
| CREATE | Privilege to create a child resource |
| UPDATE | Privilege to update the content of an addressed resource |
| DELETE | Privilege to delete an addressed resource |
| DISCOVER | Privilege to discover the resource |
| NOTIFY | Privilege to receive a notification |

In an M2M communication system, an access control policy resource is stored separately from a resource to which the corresponding access control policy has been applied. The resource to which the access control policy has been applied has only AccessRightID (URI of the access control policy resource) of the access control policy resource. Accordingly, if an M2M entity wants to check an access control policy of a specific resource, the M2M entity needs to refer to AccessRightID.

Entity Registration

An M2M entity finishes preparation for using systems/services by registering with neighboring entities irrespective of whether the M2M entity is located in the field domain or infrastructure domain. Such registration is performed at the request of a registree and information on the registree is stored in a registrar as a registration result.

After registration, oneM2M entities can use M2M services using common functions provided by a CSE, as illustrated in FIG. 3.

oneM2M entities include an AE and a CSE and thus registration may be divided into AE registration and CSE registration. Here, both the AE and CSE refer to registrees and the CSE corresponds to a registrar. In the case of CSE registration, information on the registrar CSE is additionally stored in the registree CSE.

Figure 8:
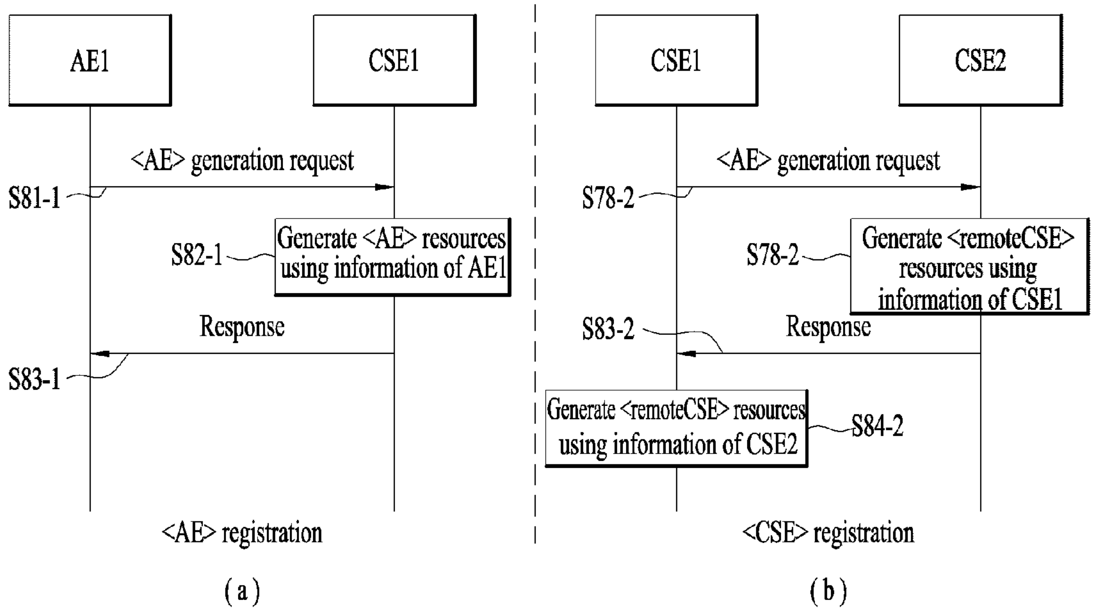
FIG. 8 is a diagram illustrating a signal flow for a registration procedure in the M2M communication system.

FIG. 8 illustrates an AE registration procedure and a CSE registration procedure. FIG. 8(*a*) shows the AE registration procedure. AE1 that intends to perform registration sends a request for generation of <AE> resources to CSE1 corresponding to a registrar (S81-1). CSE1 can generate the <AE> resources using information of AE1 (S82-2). Then, CSE1 can send a response including a result of registration to AE1 (S83-2).

FIG. 8(*b*) illustrates the CSE registration procedure. The procedure of FIG. 8(*b*) corresponds to the procedure of FIG. 8(*a*) except that CSE1 corresponds to a registree, CSE2 corresponds to a registrar, and when CSE2 sends a result for a registration request of CSE1 (S83-2), CSE1 generates <remoteCSE> resources using information of CSE2 (S84-2).

Security Association Establishment Framework

The purpose of a security association establishment framework lies in message encryption/decryption and message integrity guarantee (an entity transmitting a message can be authenticated through message integrity guarantee) after authentication and security association establishment between two entities (referred to as entity A and entity B. Each of entity A and entity B may be an AE or a CSE. In the case of m2m authentication function (MAF)-based security association establishment, a security association is established between entity A and an MAF, and the MAF assists with security association establishment between the two entities by providing entity B with credential information for use in the security association establishment between entity A and entity B). To establish the security association between the two entities, credential information should be pre-configured.

The credential information may be pre-configured in a fabrication process, or pre-configured later remotely. A credential is security key information for use in performing a security procedure including security association establishment. For example, in a symmetric key-based security procedure, a credential is a symmetric key (i.e., a secret key) shared between two entities, the identifier (ID) of the symmetric key, or the like. In a public key-based security procedure, a credential is, for example, a public key, a certificate including the public key, a private key paired with the public key, a certificate chain used in verifying the certificate, a public key ID, or a certificate ID.

Security association establishment frameworks as defined in oneM2M are provisioned symmetric key security association establishment framework, certificate-based security association establishment framework, and MAF-based symmetric key security association establishment framework. The provisioned symmetric key security association establishment framework and the MAF-based symmetric key security association establishment framework use a symmetric key-based security procedure, and the certificate-based security association establishment framework uses a public key-based security procedure. The provisioned symmetric key security association establishment framework and the certificate-based security association establishment framework are implemented though communication between two entities. In the MAF-based symmetric key security association establishment framework, a MAF server exists and configures a symmetric key for entity A and entity B to enable security association between them.

A security association establishment framework includes three phases: credential configuration, association configuration, and association security handshake.

In credential configuration, a credential of each entity is configured in the entity. In association configuration, the configured credential is associated with information about an entity with which to establish a security association. The entity does not include information about the entity with which to establish the security association. After the entity registers to a registrar, the entity may acquire the information about the entity with which to establish the security association. In this case, the entity associated during the association configuration may not be authenticated during association security handshake. Instead, the associated entity may be authenticated along with security association establishment after the registration. In the association security handshake, entity A and entity B mutually authenticate each other and establish a security context through the configured credentials. If the credentials are verified (authenticated), the entities associated during the association configuration are authenticated.

As the security association establishment framework authenticates key IDs or certificate names through the association configuration, oneM2M entities may authenticate each other (i.e., each oneM2M entity verifies the other's ID).

However, a problem occurs to authentication of a message generated after the security association procedure. That is, a malicious AE may use a different ID instead of an oneM2M ID (AE-ID or CSE-ID) used during the security association. For example, although an AE-ID (0x1234) was used during the security association, the AE uses 0x5678 as an AE-ID (inserted in an fr parameter of a oneM2M message). In this case, since the two entities have already been authenticated, a receiver of the message determines that the authentication has been completed.

Figure 9:
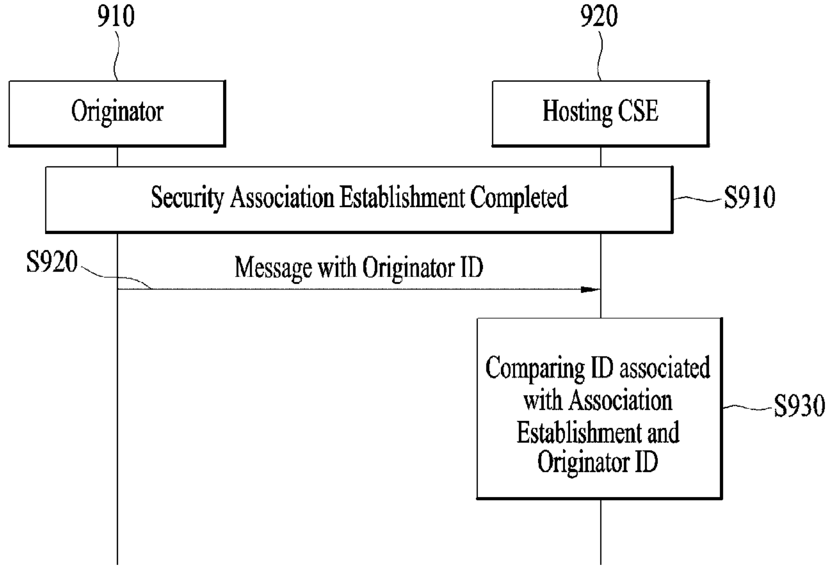
FIG. 9 is a diagram illustrating a signal flow for a procedure for preventing an impersonation attack according to an embodiment of the present invention.

The simplest solution is to verify whether the AE-ID included in the fr parameter of the message is identical to the oneM2M entity ID used during the association configuration performed in the security association for establishing a security session when the message is transmitted. This operation will be described with reference to FIG. 9.

It is assumed that security association establishment has already been completed between an originator 910 and a hosting CSE 920 (S910). Then, the originator 910 may transmit a message including the ID of the originator 910 to the hosting CSE 920 (S920). The hosting CSE 920 may compare an ID associated during association configuration with the originator ID included in the message (S930). If the originator ID included in the message is different from the ID associated during the association configuration, the hosting CSE 920 may determine that the authentication has been failed.

However, the above solution is not viable in a multi-hop environment between an originator and a hosting CSE. For example, in the presence of a transit CSE (i.e., a CSE functioning to relay a message transmitted by the originator to the hosting CSE) between the originator and the hosting CSE, association configuration and security association are performed at each hop. Therefore, the hosting CSE is just associated with the transit CSE, without a security association with the originator.

This phenomenon is attributed to the nature of oneM2M. That is, a message transmitted by the originator is transmitted hop by hop, and thus the message is vulnerable to manipulation at each hop or some hops.

For example, if an event category transmitted by the originator is beyond a range of event categories allowed by the originator, the transit CSE may change the event category and then transmit the changed event category. Or if the originator is an AE and the AE transmits a message to an entity other than a registrar CSE (a CSE to which the AE has registered) (i.e., a to parameter does not indicate the registrar CSE) using a CSE-relative-AE-ID (in an fr parameter), the registrar CSE may generate an SP-relative-AE-ID using its CSE-ID, set the SP-relative-AE-ID in the message (the fr parameter of the message), and transmit the message.

As described above, the CSE may manipulate a message as well as simply transmit a message. If a transit entity such as the transit CSE is not in a trusted relationship or an attacker attacks, lots of data is exposed to the attacker. The attacker may also cause an impersonation attack by impersonating as the transit CSE and thus manipulating the source of a message. If the source of the message is manipulated as an entity having authority for a specific resource A, the attacker may acquire the authority for the resource A.

Embodiments of the present invention will be described below. In the embodiments, an entity may be an AE or a CSE.

Figure 10:
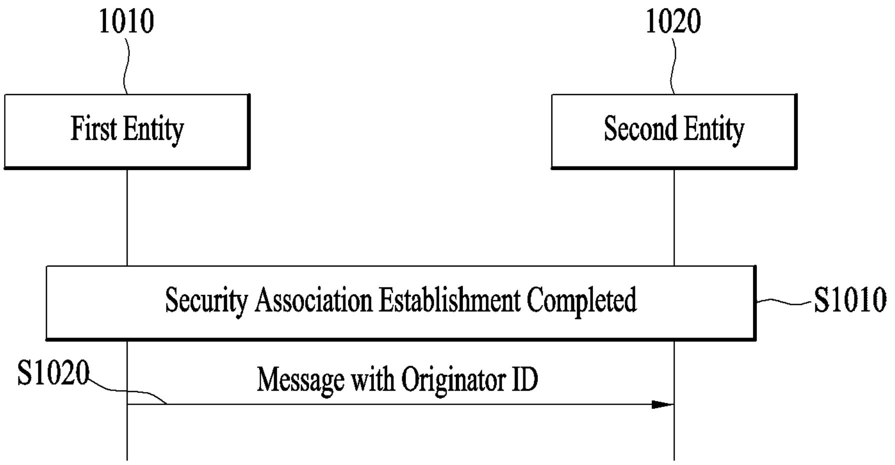
FIG. 10 is a diagram illustrating a signal flow for a procedure for preventing an impersonation attack according to an embodiment of the present invention.

FIG. 10 illustrates a method according to an embodiment of the present invention.

After security association establishment (S1010), a first entity 1010 may transmit a message with an originator ID to a second entity 1020 (S1020). The second entity 1020 determines whether it is in a direct connection relationship with the first entity 1010 that has transmitted the message (i.e., there is no transit entity (CSE) between the first entity and the second entity).

The direct connection relationship is determined in the following manner.

- If an entity transmitting a message (hereinafter, referred to as a transmitting entity) and an entity receiving the message (hereinafter, referred to as a receiving entity) are placed in a registration relationship, it may be determined that the entities are in the direct connection relationship.

Specifically, if there is a resource related to an oneM2M entity ID associated with a credential used during security association in values of an entity ID-storing attribute among resources of resource types (e.g., <AE> and <remoteCSE> resource types) for storing registration information about transmitting entities in the receiving entity, it is determined that the entities are in the registration relationship.

- If a list of directly connected entities is stored in the receiving entity, and the oneM2M entity ID associated with the credential used during the security association is included in the entity list, it is determined that the entities are in the direct connection relationship.

Meanwhile, when the message is received, the oneM2M entity ID associated with the credential used during the security association may not exist. In this case, a subsequent procedure is performed without implementing the embodiment.

Then, if the receiving entity, that is, the second entity determines that it is in the direct connection relationship with the first entity, the second entity may determine whether originator information of the message (e.g., a value of an fr parameter in the message) is related to the oneM2M entity ID.

If determining that the originator information is related to the oneM2M entity ID, the second entity may determine that there is no impersonation attack to the originator information, and process the received message.

On the other hand, if determining that the originator information is not related to the oneM2M entity ID, the second entity may determine that there is an impersonation attack to the originator information, and transmit a response message with an appropriate status code (e.g., impersonation attack or ID mismatch) in relation to the received message.

Meanwhile, the reason for determining whether the originator information is related to the oneM2M entity ID, instead of determining whether the originator information is identical to the oneM2M entity ID is that the format of the originator information may be different.

For originator information, there are the following options. That is, the following options exist depending on a receiving entity, despite the same entity.

(a) Service Provider ID (e.g., //m2mlguplus.com,// m2m.skt.com, m2m.kt.com)+Service Provider Relative Entity ID (e.g., /CSE1/CAE1, /SsmartMeterAE1, /CSE1) where + means text sequence concatenation).

(b) Service Provider Relative Entity ID (e.g., /CSE1/CAE1, Service Provider Relative Entity ID (e.g., /CSE1/CAE1, /SsmartMeterAE1, /CSE1)).

Figure 11:
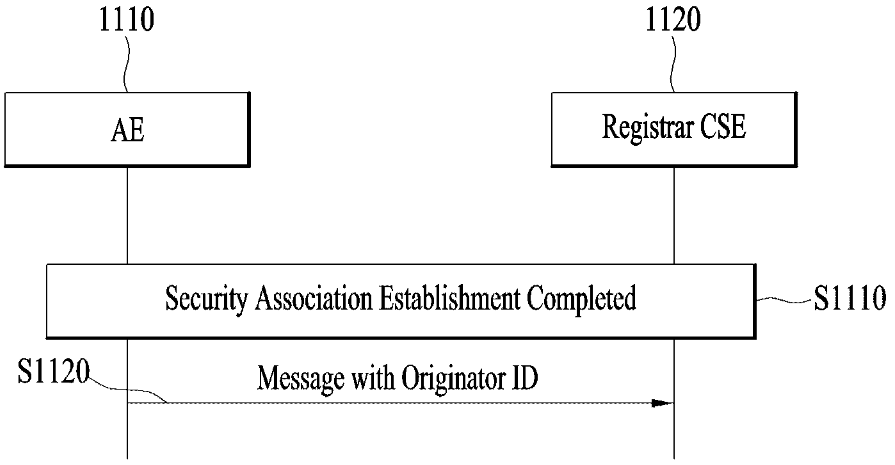
FIG. 11 is a diagram illustrating a signal flow for a procedure for preventing an impersonation attack according to an embodiment of the present invention.

FIG. 11 illustrates a method according to another embodiment of the present invention.

After security association establishment (S1110), an AE 1110 may transmit a message with an originator ID to a registrar CSE 1220 (S1120). The registrar CSE 1120 determines whether it is in a direct connection relationship with the AE 1110 that has transmitted the message (i.e., there is no transit entity (CSE) between the AE 1110 and the registrar CSE 1120).

The direct connection relationship is determined in the following manner.

If an entity transmitting a message (hereinafter, referred to as a transmitting entity) and an entity receiving the message (hereinafter, referred to as a receiving entity) are placed in a registration relationship, it may be determined that the entities are in the direct connection relationship.

Specifically, if there is a resource related to an oneM2M entity ID associated with a credential used during security association in values of an entity ID-storing attribute among resources of a resource type (e.g., <AE> resource type) for storing registration information about transmitting entities in the receiving entity, it is determined that the entities are in the registration relationship. Only the <AE> resource type is checked to check only AEs.

If a list of directly connected entities is stored in the receiving entity, and the oneM2M entity ID associated with the credential used during the security association is included in the entity list, it is determined that the entities are in the direct connection relationship.

Meanwhile, when the message is received, the oneM2M entity ID associated with the credential used during the security association may not exist. In this case, a subsequent procedure is performed without implementing the embodiment.

Then, if the receiving entity, that is, the second entity determines that it is in the direct connection relationship with the first entity, the second entity may determine whether originator information of the message (e.g., a value of an fr parameter in the message) is related to the oneM2M entity ID.

If determining that the originator information is related to the oneM2M entity ID, the second entity may determine that there is no impersonation attack to the originator information, and process the received message.

On the other hand, if determining that the originator information is not related to the oneM2M entity ID, the second entity may determine that there is an impersonation attack to the originator information and transmit a response message with an appropriate status code (e.g., impersonation attack or ID mismatch) in relation to the received message.

Meanwhile, the reason for determining whether the originator information is related to the oneM2M entity ID, instead of determining whether the originator information is identical the oneM2M entity ID is that the format of the originator information may be different.

For originator information, there are the following options. That is, the following options exist depending on a receiving entity, despite the same entity.

(a) Service Provider ID (e.g., //m2mlguplus.com,// m2m.skt.com, m2m.kt.com)+Service Provider Relative Entity ID (e.g., /CSE1/CAE1, /SsmartMeterAE1, /CSE1) where + means text sequence concatenation).

(b) Service Provider Relative Entity ID (e.g., /CSE1/CAE1, Service Provider Relative Entity ID (e.g., /CSE1/CAE1, /SsmartMeterAE1, /CSE1)).

Now, a description will be given of a method according to another embodiment of the present invention.

The method is about prevention of an impersonation attack to a hosting CSE. This method is viable in a situation where an originator is capable of generating a message integrity code for a message to be transmitted to a hosting CSE, and the hosting CSE is capable of verifying the message integrity code in the received message. Therefore, secret information (e.g., key information) used for generation of the integrity code should be shared between the originator and the hosting CSE.

The method considers an environment in which an entity residing in a transit communication path (i.e., a transit entity) between the originator and the hosting CSE is capable of modifying a specific part of a message. Owing to the message modification, quality of service (QoS) may be handled flexibly in processing the message and the transit entity may perform processes on behalf of the originator, for the convenience of the originator. For example, the transit entity may change the format of a message ID.

However, if the transit entity is an attacker, it may modify a specific part of the message which is not allowed for modification, and transmit the modified message.

A main purpose of preventing impersonation lies in accurate access control. That is, the authority of an originator may be clarified by accurately identifying the originator.

Conventionally, a message integrity code is generated for an entire message transmitted by an originator, and a hosting CSE verifies the integrity code for the received message. In contrast, an integrity code is generated for a reconstruction value for specific parts of a message, and a hosting CSE verifies the integrity code, to thereby prevent an impersonation attack in the method of the present invention.

One of the following two parts of a message should be protected by means of an integrity code.

Factors that may change access or non-access through modification, which are parameters used for access control, such as the source of a message (i.e., originator information, an fr parameter in the message) and role (a role value used for access control).

Message parameters other than message parameters that are subject to modification at a transit CSE.

For this purpose, values, sequences, and formats of message parameters used for generation of an integrity code may be shared between the originator and the hosting CSE, or an indicator providing this information may be included in the message. The indicator may be included in the message and protected during generation of the integrity code.

The reconstruction of a message used for generation of an integrity code is not related to the format of the transmission message. Thus, it is also useful even though the message format is changed in the middle of transmission. For example, even though a message is transmitted in extensible markup language (XML) between the originator and the transit CSE and in javascript object notation (JSON) between the transit CSE and the hosting CSE, an integrity code may be generated and verified irrespective of the message formats in the present invention.

An example of a message to be transmitted by an originator is given as follows.

```
<?xml version="1.0" encoding="UTF-8"?>
 <m2m:reqestPrimitive xmlns:m2m=
 "http://www.onem2m.org/xml/protocols'
xmlns:xsi="http://www.w3.org/2001/XMLSchema-instance"
xsi:schemaLocation="http://www.onem2m.org/xml/protocols
CDT-requestPrimitive-v1_0_0.xsd">
 <operation>3</operation>
 <to>/CSE1Base/AE1</to>
 <from>/AE1</from>
 <role>Administrator</role>
```

-continued

```
<requestIdentifier>AE1/1234</requestIdentifier>
<primitiveContent>
 <m2m:ae xmlns:m2m="http://www.onem2m.org/xml/protocols"
xmlns:xsi="http://www.w3.org/2001/XMLSchema-instance"
xsi:schemaLocation="http://www.onem2m.org/xml/protocols
CDT-ae-v1__0__0.xsd">
<label>Seoul Seocho Bangbae-dong</label>
<expirationTime>20141003T111111</expirationTime>
<applicationName></applicationName>
<pointOfAccess>192.168.0.6/AE6</pointOfAccess>
</m2m:ae>
</primitiveContent>
</m2m:reqestPrimitive>
```

When transmitting this message, the originator generates an integrity code for a part to be protected. If the source and role of the message should be protected in the above example, an integrity code is generated for the following text sequence. A method for forming the following text sequence is shared between the originator and the hosting CSE.

/AE1||Administrator

If the generated integrity code is "d41d8cd98f00b204e9800998ecf8427e", the originator may include the integrity code in the message and transmit the message.

```
<?xml version="1.0" encoding="UTF-8"?>
  <m2m:reqestPrimitive xmlns:m2m=
  "http://www.onem2m.org/xml/protocols'
 xmlns:xsi="http://www.w3.org/2001/XMLSchema-instance"
 xsi:schemaLocation="http://www.onem2m.org/xml/protocols
 CDT-requestPrimitive-v1__0__0.xsd">
<operation>3</operation>
 <to>/CSE1Base/AE1</to>
<from>/AE1</from>
<role>Administrator</role>
<requestIdentifier>AE1/1234</requestIdentifier>
<primitiveContent>
  <m2m:ae xmlns:m2m=
  "http://www.onem2m.org/xml/protocols"
 xmlns:xsi="http://www.w3.org/2001/XMLSchema-instance"
xsi:schemaLocation="http://www.onem2m.org/xml/protocols
CDT-ae-v1__0__0.xsd">
  <label>Seoul Seocho Bangbae-dong</label>
 <expirationTime>20141003T111111</expirationTime>
 <applicationName></applicationName>
<pointOfAccess>192.168.0.6/AE6</pointOfAccess>
 </m2m:ae>
 </primitiveContent>
<integrityCode>d41d8cd98f00b204e9800998ecf8427e
<integrityCode>
 </m2m:reqestPrimitive>
```

Upon receipt of the message, the hosting CSE may derive the message to be protected with the integrity code, using the shared parameter, parameter sequence, and format information used for the integrity code.

The hosting CSE may determine whether an integrity code identical to the received integrity code is generated by inputting the shared same key information and the message to be protected with an integrity code to an integrity code generation function, to verify the integrity code.

Figure 12:
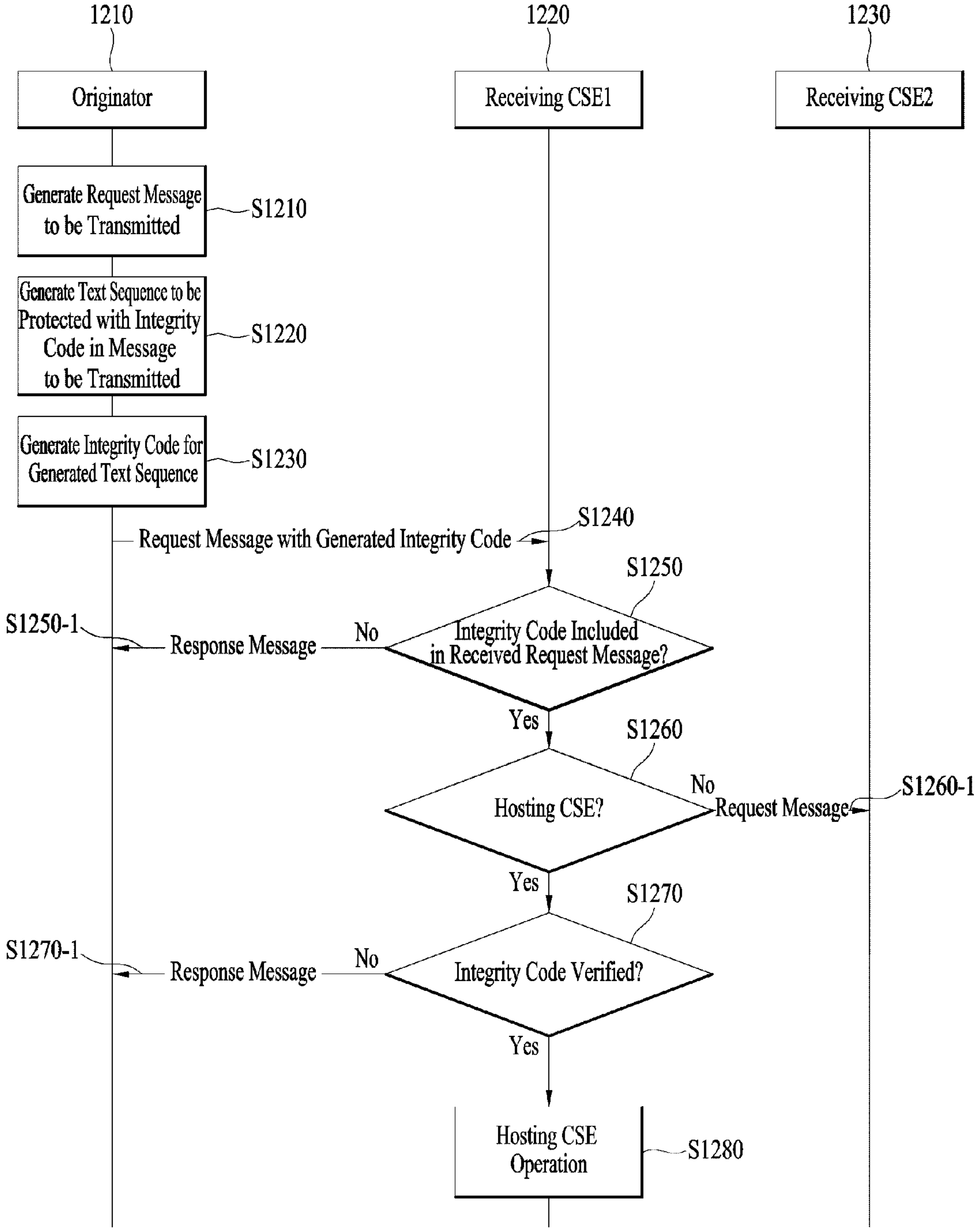
FIG. 12 is a diagram illustrating a signal flow for a procedure for preventing an impersonation attack according to an embodiment of the present invention.

FIG. 12 illustrates a method according to another embodiment of the present invention.

The method may be performed irrespective of whether a transit CSE is present on a communication path between an originator and a hosting CSE. It is assumed that security association has been completed at each hop. There may exist zero or more transit CSEs between an originator 1210 and a first receiving CSE (receiving CSE1) 1220.

The originator 1210 may generate a resource access-related request message to be transmitted (Create, Retrieve, Notify, Discovery, Delete, Notify, or the like) (S1210). Then, the originator 1210 may generate a text sequence to be protected with an integrity code in the message to be transmitted (S1220). It is assumed that information indicating how a text sequence is generated, for example, what message parameters are to be protected with the integrity code, a format in the case of generating the text sequence, and information indicating the order of parameters in the case of generating the text sequence are shared preliminarily.

For the generated text sequence, the originator 1210 may generate an integrity code using a credential for generation of the integrity code, shared between the originator 1210 and the hosting CSE (S1230). Subsequently, the originator 1210 may transmit the request message including the generated integrity code to the receiving CSE1 1220 (S1240).

The receiving CSE1 1220 may determine whether there is an integrity code in the received request message (S1250). In the absence of an integrity code in the received request message, the receiving CSE1 1220 may indicate the absence of an integrity code in the request message to the originator 1210 (S1250-1). That is, the receiving CSE1 1220 may transmit a response message to the request message, with an indicator or value indicating the absence of an integrity code in the request message to the originator 1210.

In the presence of an integrity code in the received request message, the receiving CSE1 1220 may determine whether it is a hosting CSE related to the received request message (S1260). The determination may be made by checking whether a target address of the received request message indicates a specific resource or attribute of the receiving CSE1 1220. For example, if the target address of the received request message indicates the specific resource or attribute of the receiving CSE1 1220, the receiving CSE1 1220 is the hosting CSE related to the received request message. Otherwise, the receiving CSE1 1220 is not the hosting CSE related to the received request message.

If the receiving CSE1 1220 is not the hosting CSE related to the received request message, the receiving CSE1 1220 may manipulate or process the received request message and then transmit the manipulated or processed request message to a second receiving (receiving CSE2) 1230 (S1260-1).

If the receiving CSE1 1220 is the hosting CSE related to the received request message, the receiving CSE1 1220 may verify the integrity code for the received request message (S1270). That is, the receiving CSE1 1220 may generate a text sequence to be protected with the integrity code in the received request message, and generate the integrity code using a credential shared for generation of the integrity code between the originator 1210 and the receiving CSE1 1220 (i.e., the hosting CSE). If the integrity code included in the received request message is identical to the generated integrity code, the integrity code verification is completed. If the two integrity codes are different, the integrity code verification is failed.

Upon failure of the integrity code verification, the receiving CSE1 1220 may notify the originator 1210 of the failure of the integrity code verification (S1270-1). That is, the receiving CSE1 1220 may transmit a response message to the request message, with an indicator or value indicating the failure of the integrity code verification.

If the integrity code verification is successful, the receiving CSE1 1220 may play the role of the hosting CSE. The role as the hosting CSE may include an access control operation.

Meanwhile, step S1250 may be performed only when the originator 1210 and the receiving CSE1 1220 are placed in a direct connection relationship.

The direct connection relationship is determined in the following manner.

If an entity transmitting a message (hereinafter, referred to as a transmitting entity) and an entity receiving the message (hereinafter, referred to as a receiving entity) are placed in a registration relationship, it may be determined that the entities are in the direct connection relationship.

Specifically, if there is a resource related to an oneM2M entity ID associated with a credential used during security association in values of an entity ID-storing attribute among resources of resource types (e.g., <AE> and <remoteCSE> resource types) for storing registration information about transmitting entities in the receiving entity, it is determined that the entities are in the registration relationship.

If a list of directly connected entities is stored in the receiving entity, and the oneM2M entity ID associated with the credential used during the security association is included in the entity list, it is determined that the entities are in the direct connection relationship.

Figure 13:
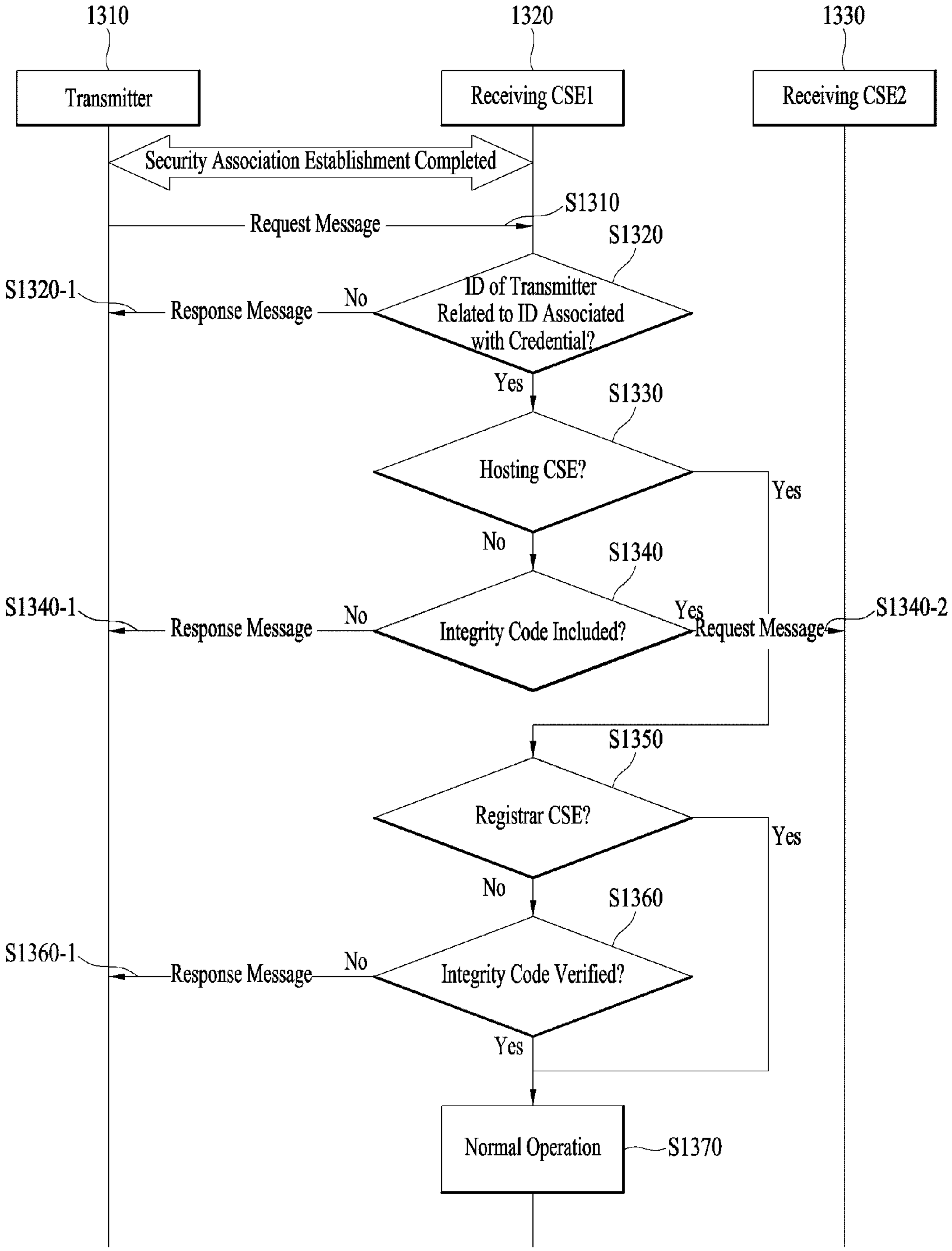
FIG. 13 is a diagram illustrating a signal flow for a procedure for preventing an impersonation attack according to an embodiment of the present invention.

FIG. 13 illustrates a method according to another embodiment of the present invention.

In the method, an integrity code is used only when a message originator and a hosting CSE are not in the direct connection relationship (i.e., there is a transit CSE between the message originator and the hosting CSE). That is, if the message originator and the hosting CSE are in the direct connection relationship, an impersonation attack may be prevented in a different manner.

In the method, to distinguish an actual originator that generates a received or transmitted message from an entity that relays the message, an originator that generates and initially transmits a message is referred to as a message originator, and an entity that relays the message is referred to as a message transmitter. The ID of the message originator or the ID of the message transmitter may be included in the transmitted or relayed message. That is, when relaying the message, a transit CSE may insert its ID in information related to the message transmitter without manipulating information related to the message originator.

If the message originator and the message transmitter are identical, the ID of one of them may be included and transmitted in the transmitted or relayed message. A receiving CSE determines that the originator and the receiver of the message are identical.

In FIG. 13, it is assumed that security association has been completed at each hop. There may exist zero or more transit CSEs between a message originator and a receiving CSE1.

A security association has been established between two directly connected entities, a transmitter 1310 and a receiving CSE1 1320.

The transmitter 1310 may transmit a resource access-related request message to the receiving CSE1 1320 (S1310). The transmitter 1310 may or may not be a message originator.

If the transmitter 1310 is the message originator, the transmitter 1310 may determine whether it is in the direct connection relationship with a target of the request message, a hosting CSE. If the transmitter 1310 is not in the direct connection relationship with the hosting CSE, the transmitter 1310 may transmit a request message including an integrity code to the receiving CSE1 1320. As described later, only if the message originator is not in the direct connection relationship with the hosting CSE, that is, there are one or more transit CSEs between them, the integrity code may be included in the request message.

If determining to include an integrity code in the request message, the transmitter 1310 may generate a text sequence to be protected with the integrity code in the message to be transmitted.

It is assumed that information indicating how a text sequence is generated, for example, what message parameters are to be protected with the integrity code, a format in the case of generating the text sequence, and information indicating the order of parameters in the case of generating the text sequence are shared preliminarily.

For the generated text sequence, the transmitter 1310 may generate an integrity code using a credential for generation of the integrity code, shared between the transmitter 1310 and the hosting CSE. Subsequently, the transmitter 1310 may transmit the request message including the generated integrity code to the receiving CSE1 1320.

The receiving CSE1 1320 may determine whether the ID of the transmitter 1310 is related to an oneM2M entity ID associated with a credential used during the security association (S1320). In the absence of a credential associated during the security association, the procedure may proceed to step S1330, skipping step S1320.

If the ID of the transmitter 1310 is not related to the oneM2M entity ID associated with the credential, the receiving CSE1 1320 may determine that the ID of the transmitter 1310 has been manipulated and transmit a response message to the request message to the transmitter 1310 (S1320-1). The response message may include an indicator or value indicating no relation.

Meanwhile, the reason for determining whether information about the transmitter 1310 is related to the oneM2M entity ID associated with the credential without determining whether the information about the transmitter 1310 is identical to the oneM2M entity ID associated with the credential is that the format of the information about the transmitter 1310 may be different.

For transmitter information, there are the following options. That is, the following options exist depending on a receiving entity, despite the same entity.

(a) Service Provider ID (e.g., //m2mlguplus.com,// m2m.skt.com, m2m.kt.com)+Service Provider Relative Entity ID (e.g., /CSE1/CAE1, /SsmartMeterAE1, /CSE1) where + means text sequence concatenation).

(b) Service Provider Relative Entity ID (e.g., /CSE1/ CAE1, Service Provider Relative Entity ID (e.g., /CSE1/ CAE1, /SsmartMeterAE1, /CSE1)).

If the ID of the transmitter 1310 is related to the oneM2M entity ID associated with the credential, the receiving CSE1 1320 may determine whether it is the hosting CSE related to the request message (S1330).

The determination may be made by checking whether a target address of the received request message indicates a specific resource or attribute of the receiving CSE1 1320. For example, if the target address of the received request message indicates the specific resource or attribute of the receiving CSE1 1320, the receiving CSE1 1320 is the hosting CSE related to the received request message. Otherwise, the receiving CSE1 1320 is not the hosting CSE related to the received request message.

If determining that the receiving CSE1 1320 is not the hosting CSE related to the received request message, the receiving CSE1 1320 may determine whether there is an integrity code in the received request message (S1340).

In the absence of an integrity code in the received request message, the receiving CSE1 1320 may transmit a response message to the request message to the transmitter 1310 (S1340-1). The response message may include an indicator or value indicating the absence of an integrity code.

In the absence of an integrity code in the received request message, the receiving CSE1 1320 may transmit the response message without unnecessary message transmission (S1340-1). In the presence of an integrity code, the receiving CSE1 1320 may forward the request message to a receiving CSE2 1330 (S1340-2).

The receiving CSE1 1320 may determine whether it is a registrar CSE (S1350). That is, the receiving CSE1 1320 may determine whether it is a CSE to which the transmitter 1310 has registered. If the ID of the message transmitter included in the request message is identical to the ID of the message originator, the receiving CSE1 1320 may determine that it is the registrar CSE. If the receiving CSE1 1320 is the registrar CSE, it does not need to verify the integrity code additionally because it has already been verified that there is no impersonation attack in step S1320.

If determining that the receiving CSE1 1320 is not the registrar CSE, the receiving CSE1 1320 may verify the integrity code (S1360).

That is, the receiving CSE1 1320 may generate a text sequence to be protected with the integrity code in the received request message, and generate the integrity code using a credential shared for generation of an integrity code between the originator of the request message (i.e., the message originator) and the receiving CSE1 1320. If the integrity code included in the received request message is identical to the generated integrity code, the integrity code verification is completed. If the two integrity codes are different, the integrity code verification is failed.

If the integrity code verification is failed, the receiving CSE1 1320 may indicate the failure of the integrity code verification to the transmitter 1310 (S1360-1). That is, the receiving CSE1 1320 may transmit a response message including an indicator or value indicating the failure of the integrity code verification.

If the integrity code verification is successful in step S1360 or the receiving CSE1 1320 determines that it is the registrar CSE in step S1350, the receiving CSE1 1320 may play the role of the hosting CSE (S1370).

The role of the hosting CSE may include an access control operation.

Figure 14:
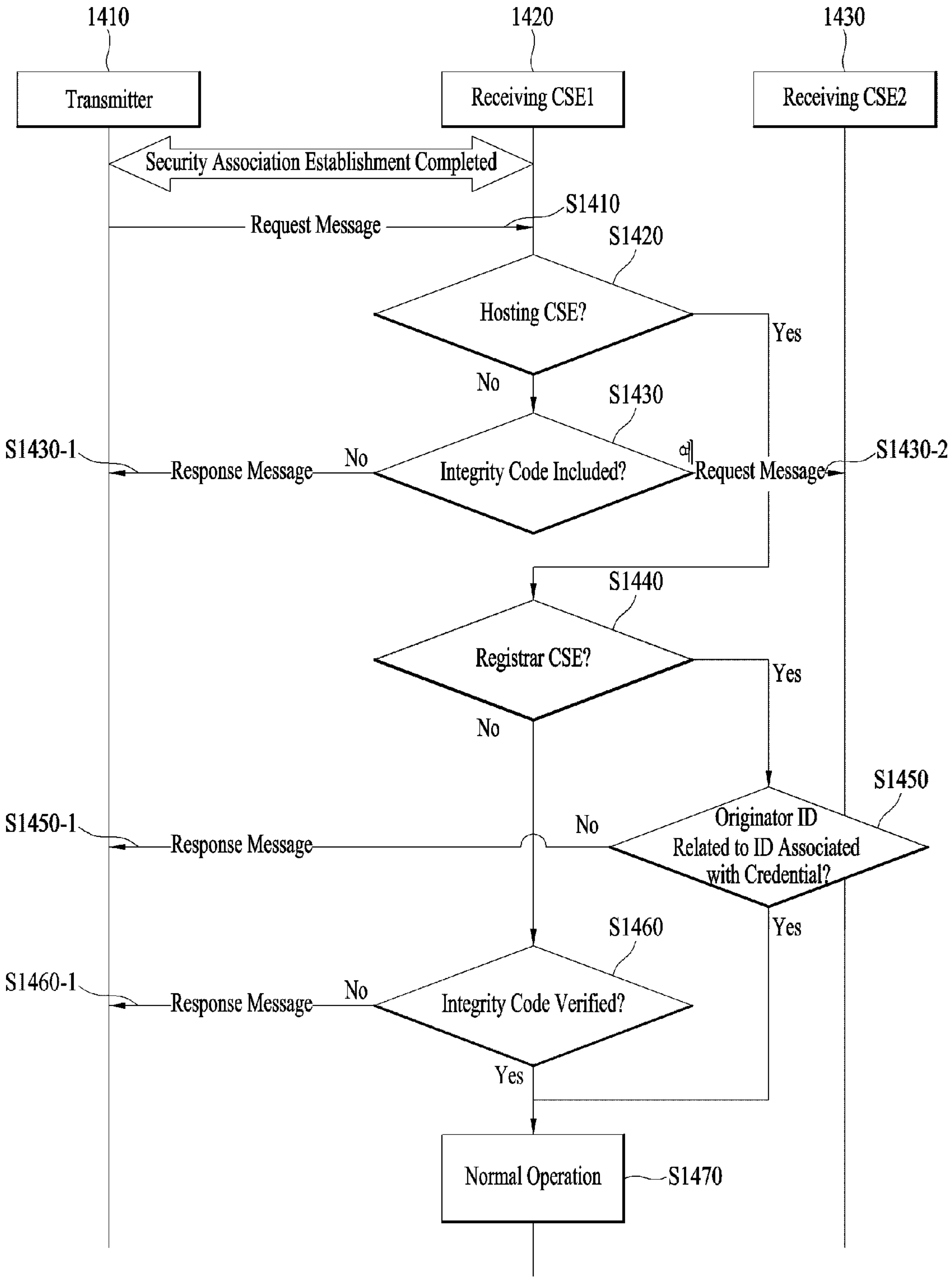
FIG. 14 is a diagram illustrating a signal flow for a procedure for preventing an impersonation attack according to an embodiment of the present invention.

FIG. 14 illustrates a method according to another embodiment of the present invention.

In the method, an integrity code is used only when a message originator and a hosting CSE are not in the direct connection relationship (i.e., there is a transit CSE between the message originator and the hosting CSE). That is, if the message originator and the hosting CSE are in the direct connection relationship, an impersonation attack may be prevented in a different manner.

In FIG. 14, it is assumed that a security association has been completed at each hop. There may exist zero or more transit CSEs between a transmitter and a receiving CSE.

A security association has been established between two directly connected entities, a transmitter 1410 and a receiving CSE1 1420.

The transmitter 1410 may transmit a resource access-related request message to the receiving CSE1 1420 (S1410). The transmitter 1410 may or may not be a message originator. If the transmitter 1410 is the message originator, the transmitter 1410 may determine whether it is in the direct connection relationship with a target of the request message, a hosting CSE. If the transmitter 1410 is not in the direct connection relationship with the hosting CSE, the transmitter 1410 may transmit a request message including an integrity code to the receiving CSE1 1420.

If determining to include the integrity code in the request message (i.e., the transmitter is the originator of the request message and is not in the direct connection relationship with the hosting CSE related to the request message), the transmitter 1410 may generate a text sequence to be protected with the integrity code in the message to be transmitted.

It is assumed that information indicating how a text sequence is generated, for example, what message parameters are to be protected with the integrity code, a format in the case of generating the text sequence, and information indicating the order of parameters in the case of generating the text sequence are shared preliminarily.

For the generated text sequence, the transmitter 1410 may generate an integrity code using a credential for generation of the integrity code, shared between the transmitter 1410 and the hosting CSE. Subsequently, the originator may transmit the request message including the generated integrity code to the receiving CSE1 1420.

The receiving CSE1 1420 may determine whether it is the hosting CSE related to the request message (S1420). The determination may be made by checking whether a target address of the received request message indicates a specific resource or attribute of the receiving CSE1 1420. For example, if the target address of the received request message indicates the specific resource or attribute of the receiving CSE1 1420, the receiving CSE1 1420 is the hosting CSE related to the received request message. Otherwise, the receiving CSE1 1420 is not the hosting CSE related to the received request message.

If determining that the receiving CSE1 1420 is not the hosting CSE related to the received request message, the receiving CSE1 1420 may determine whether there is an integrity code in the received request message (S1430).

In the absence of an integrity code in the received request message, the receiving CSE1 1420 may transmit a response message to the request message to the transmitter 1410 (S1430-1). The response message may include an indicator or value indicating the absence of an integrity code.

In the absence of an integrity code in the received request message, the receiving CSE1 1420 may transmit the response message without unnecessary message transmission (S1430-1). In the presence of an integrity code, the receiving CSE1 1420 may forward the request message to a receiving CSE2 1330 (S1430-2).

The receiving CSE1 1420 may determine whether it is a registrar CSE (S1440). That is, the receiving CSE1 1420 may determine whether it is a CSE to which the transmitter 1410 has registered.

The determination may be made by checking whether there is a resource storing the same value as originator information of the request message (i.e., the ID of the entity generating the request message is set as a value of a from parameter) among resources of resource types (e.g., <AE> and <remoteCSE> resource types> that store registration information. In the presence of a resource storing the same value as the originator information, the receiving CSE1 1420 may determine that it is a registrar CSE of the transmitter 1410.

If determining that the receiving CSE1 1420 is the registrar CSE of the transmitter 1410, the receiving CSE1 1420 may determine whether the ID of the originator is related to an oneM2M entity ID associated with a credential used during the security association (S1450).

If the ID of the transmitter 1410 is not related to the oneM2M entity ID associated with the credential, the receiving CSE1 1420 may determine that the ID of the transmitter 1410 has been manipulated and transmit a response message to the request message to the transmitter 1410 (S1450-1). The response message may include an indicator or value indicating no relation.

Meanwhile, the reason for determining whether information about the transmitter 1410 is related to the oneM2M entity ID instead of determining whether the information about the transmitter 1410 is identical to the oneM2M entity ID is that the format of the information about the transmitter 1410 may be different.

For transmitter information, there are the following options. That is, the following options exist depending on a receiving entity, despite the same entity.

(a) Service Provider ID (e.g., //m2mlguplus.com,// m2m.skt.com, m2m.kt.com)+Service Provider Relative Entity ID (e.g., /CSE1/CAE1, /SsmartMeterAE1, /CSE1) where + means text sequence concatenation).

(b) Service Provider Relative Entity ID (e.g., /CSE1/CAE1, Service Provider Relative Entity ID (e.g., /CSE1/CAE1, /SsmartMeterAE1, /CSE1)).

If determining that the receiving CSE1 1420 is not the registrar CSE, the receiving CSE1 1420 may verify the integrity code (S1460).

That is, the receiving CSE1 1420 may generate a text sequence to be protected with the integrity code in the received request message (because it has been determined that the receiving CSE1 1420 is the hosting CSE related to the request message), and generate the integrity code using a credential shared for generation of the integrity code between the originator of the request message (i.e., the message originator) and the receiving CSE1 1320. If the integrity code included in the received request message is identical to the generated integrity code, the integrity code verification is completed. If the two integrity codes are different, the integrity code verification is failed.

If the integrity code verification is failed, the receiving CSE1 1420 may indicate the failure of the integrity code verification to the transmitter 1410 (S1460-1). That is, the receiving CSE1 1320 may transmit a response message including an indicator or value indicating the failure of the integrity code verification.

If the integrity code verification is successful in step S1460 or the receiving CSE1 1420 determines that it is the registrar CSE in step S1450, the receiving CSE1 1420 may play the role of the hosting CSE (S1470).

The role of the hosting CSE may include an access control operation.

Determining whether the receiving CSE1 1420 is a registrar CSE in step S1440 means that the transmitter 1410 is the originator of the request message and the receiving CSE1 1420 is the hosting CSE related to the request message. Therefore, since it is verified that there is no impersonation attack in step S1450, there is no need for verifying the integrity code additionally. That is, an integrity code is not needed to check whether there is an impersonation attack in the case of a direct connection relationship, unlike the case of a non-direct connection relationship.

Figure 15:
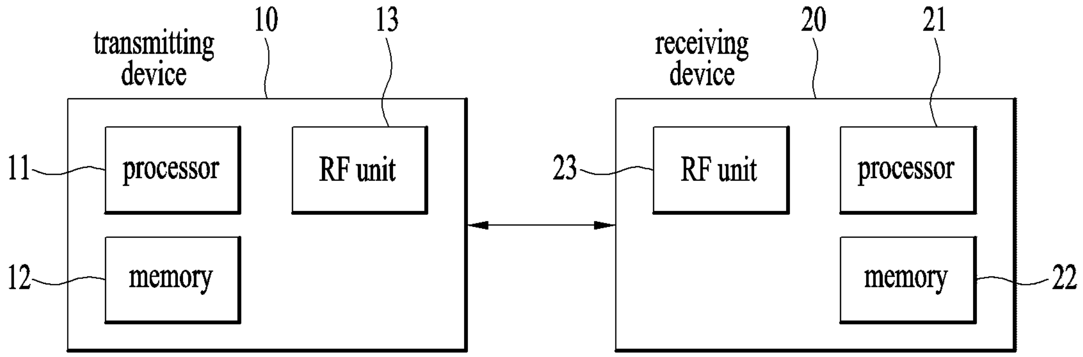
FIG. 15 is a block diagram of apparatuses for implementing an embodiment(s) of the present invention.

FIG. 15 is a block diagram of a transmitting device 10 and a receiving device 20 configured to implement exemplary embodiments of the present invention. Referring to FIG. 15, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

In the embodiments of the present invention, application (entity) or resource related entity etc. may operate as devices in which they are installed or mounted, that is, a transmitting device 10 or a receiving device 20.

The specific features of the application (entity) or the resource related entity etc. such as the transmitting device or the receiving device may be implemented as a combination of one or more embodiments of the present invention described above in connection with the drawings.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention may be used for a wireless communication apparatus such as a terminal, a base station, a server, or other apparatuses.

The invention claimed is:

1. A method for processing a request message by a first machine to machine (M2M) entity in a wireless communication system, the method comprising:

- receiving a request message related to an operation for a specific resource from a second M2M entity;
- determining whether the first M2M entity has the specific resource; and
- if the first M2M entity does not have the specific resource, determining whether an integrity code is included in the request message;

if the integrity code is included in the request message, transmitting the request message to a third M2M entity; or if the first M2M entity has the specific resource, determining whether the first M2M entity has a registration relationship with the second M2M entity; and if the first M2M entity does not have the registration relationship with the second M2M entity, verifying an integrity code included in the request message.

2. The method according to claim 1, wherein the determining of whether the first M2M entity has a registration relationship with the second M2M entity comprises determining whether an identifier (ID) of an originator included in the request message is identical to an ID of the second M2M entity.

3. The method according to claim 1, wherein the determining of whether the first M2M entity has a registration relationship with the second M2M entity comprises determining whether information correlated to the second M2M entity is stored in a specific attribute of a resource that the first M2M entity has.

4. The method according to claim 1, wherein if an originator of the request message does not have the registration relationship with an entity having the specific resource, the integrity code is included by the originator in the request message.

5. The method according to claim 1, wherein information to be used for generating the integrity code is shared in advance between an originator of the request message and an entity having the specific resource.

6. The method according to claim 1, wherein information to be protected by the integrity code includes a specific part of the request message.

7. The method according to claim 6, wherein the specific part includes information on an originator of the request message.

8. The method according to claim 1, further comprising determining whether an ID of the second M2M entity and an ID associated with a credential related to security association have a correlation.

9. The method according to claim 1, wherein the determining of whether the first M2M entity has the specific resources is performed, only if it is determined that an ID of the second M2M entity and an ID associated with a credential related to security association have a correlation.

10. A machine to machine (M2M) apparatus for processing a request message in a wireless communication system, the M2M apparatus comprising:

a radio frequency (RF) unit; and a processor configured to control the RF unit, wherein the processor is configured to: receive a request message related to an operation for a specific resource from a second M2M entity, determine whether the first M2M entity has the specific resource, determine, if the first M2M entity does not have the specific resource, whether an integrity code is included in the request message, transmit, if the integrity code is included in the request message, the request message to a third M2M entity or determine, if the first M2M entity has the specific resource, whether the first M2M entity has a registration relationship with the second M2M entity, and verify, if the first M2M entity does not have the registration relationship with the second M2M entity, an integrity code included in the request message.

11. The M2M apparatus according to claim 10, wherein to determine whether the first M2M entity has the registration relationship with the second M2M entity, the processor is configured to determine whether an identifier (ID) of an originator included in the request message is identical to an ID of the second M2M entity.

12. The M2M apparatus according to claim 10, wherein to determine whether the first M2M entity has the registration relationship with the second M2M entity, the processor is configured to determine whether information correlated to the second M2M entity is stored in a specific attribute of a resource that the first M2M entity has.

13. The M2M apparatus according to claim 10, wherein if an originator of the request message does not have the registration relationship with an entity having the specific resource, the integrity code is included by the originator in the request message.

14. The M2M apparatus according to claim 10, wherein information to be used for generating the integrity code is shared in advance between an originator of the request message and an entity having the specific resource.

15. The M2M apparatus according to claim 10, wherein information to be protected by the integrity code includes a specific part of the request message.

16. The M2M apparatus according to claim 15, wherein the specific part includes information on an originator of the request message.

17. The M2M apparatus according to claim 10, wherein the processor is configured to determine whether an ID of the second M2M entity and an ID associated with a credential related to security association have a correlation.

18. The M2M apparatus according to claim 10, wherein it is determined whether the first M2M entity has the specific resources is performed, only if it is determined that an ID of the second M2M entity and an ID associated with a credential related to security association have a correlation.

* * * * *